(12) United States Patent
Kapusky et al.

(10) Patent No.: US 10,377,286 B2
(45) Date of Patent: Aug. 13, 2019

(54) FOLDING HEAD RESTRAINT MECHANISM

(71) Applicant: Johnson Controls Technology Company, Holland, MI (US)

(72) Inventors: Michael Kapusky, Milan, MI (US); Patrick Donnelly, Brighton, MI (US); David Hayes, West Bloomfield Township, MI (US); Srinivasa Sanku, Northville, MI (US); Michael Leighton, LaSalle (CA); Edward J. Lamont, Livonia, MI (US); Joel Jamison, Dexter, MI (US); Kurt A. Seibold, Whitmore Lake, MI (US)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 173 days.

(21) Appl. No.: 15/303,057

(22) PCT Filed: Apr. 13, 2015

(86) PCT No.: PCT/EP2015/057986
§ 371 (c)(1),
(2) Date: Oct. 10, 2016

(87) PCT Pub. No.: WO2015/158666
PCT Pub. Date: Oct. 22, 2015

(65) Prior Publication Data
US 2017/0028884 A1   Feb. 2, 2017

Related U.S. Application Data

(60) Provisional application No. 61/979,104, filed on Apr. 14, 2014, provisional application No. 61/979,063, (Continued)

(51) Int. Cl.
*B60N 2/841* (2018.01)
*B60N 2/856* (2018.01)

(52) U.S. Cl.
CPC ............. *B60N 2/841* (2018.02); *B60N 2/856* (2018.02)

(58) Field of Classification Search
None
See application file for complete search history.

(56) References Cited

U.S. PATENT DOCUMENTS 5,826,942 A * 10/1998 Sutton .................. B60N 2/3013
297/378.12
6,050,633 A * 4/2000 Droual .................. B60N 2/874
297/61
(Continued)

FOREIGN PATENT DOCUMENTS

EP        2036459 A1    3/2009
JP     2006015021 A    1/2006
KR    20070097302 A   10/2007

OTHER PUBLICATIONS

Search Report and Written Opinion for Application No. PCT/EP2015/057986 dated Jun. 22, 2015.

*Primary Examiner* — David E Allred
(74) *Attorney, Agent, or Firm* — The Dobrusin Law Firm, P.C.

(57) ABSTRACT

A mechanism for folding a head restraint for a backrest of a seat, including a head restraint and a cross portion, where the cross portion is fixed relative to the backrest. The cross portion defines a first pivot axis, which the head restraint is pivoted about. The cross portion includes a locking disc. The head restraint comprises a cam that pivots about a second pivot axis. The head restraint is configured to be positioned in a usage-position relative to the cross portion and a storage-position relative to the cross portion. The position of the head restraint is changeable between the usage-position and the storage-position by pivoting about the first pivot axis. The cam is configured to be positioned in a locking-
(Continued)

position and a releasing-position relative to the head restraint.

14 Claims, 32 Drawing Sheets

Related U.S. Application Data filed on Apr. 14, 2014, provisional application No. 61/979,088, filed on Apr. 14, 2014, provisional application No. 61/979,106, filed on Apr. 4, 2014.

(56) References Cited

U.S. PATENT DOCUMENTS

| | | | |
|---|---|---|---|
| 7,322,646 B2* | 1/2008 | Jammalamadaka | B60N 2/844 297/216.12 |
| 7,325,877 B2* | 2/2008 | Brockman | B60N 2/844 297/408 |
| 7,422,280 B2 | 9/2008 | Brockman | |
| 7,988,234 B2 | 8/2011 | Kim et al. | |
| 8,083,291 B2 | 12/2011 | Yoshida | |
| 8,104,836 B2* | 1/2012 | Little | B60N 2/856 297/408 |
| 8,226,170 B2* | 7/2012 | Lutzka | B60N 2/3009 297/408 |
| 8,246,116 B1* | 8/2012 | Sutter, Jr. | B60N 2/844 297/408 |
| 8,348,347 B2 | 1/2013 | Willard et al. | |
| 8,857,910 B2* | 10/2014 | Jeong | B60N 2/856 297/408 |
| 8,864,236 B2* | 10/2014 | Sayama | B60N 2/4858 297/408 |
| 9,475,415 B2* | 10/2016 | Grable | B60N 2/4844 |
| 9,688,172 B2* | 6/2017 | Nilsson | B60N 2/4855 |
| 9,980,570 B2* | 5/2018 | Jeong | A47C 3/38 |
| 2010/0283305 A1 | 11/2010 | Yetukuri et al. | |
| 2010/0327645 A1 | 12/2010 | Jeong | |
| 2015/0232002 A1* | 8/2015 | Little | B60N 2/844 297/408 |
| 2016/0332547 A1* | 11/2016 | Yamane | B60N 2/4847 |
| 2017/0158101 A1* | 6/2017 | Little | B60N 2/853 |
| 2017/0182916 A1* | 6/2017 | Yamane | B60N 2/4855 |
| 2018/0111521 A1* | 4/2018 | Imayou | B60N 2/80 |

* cited by examiner

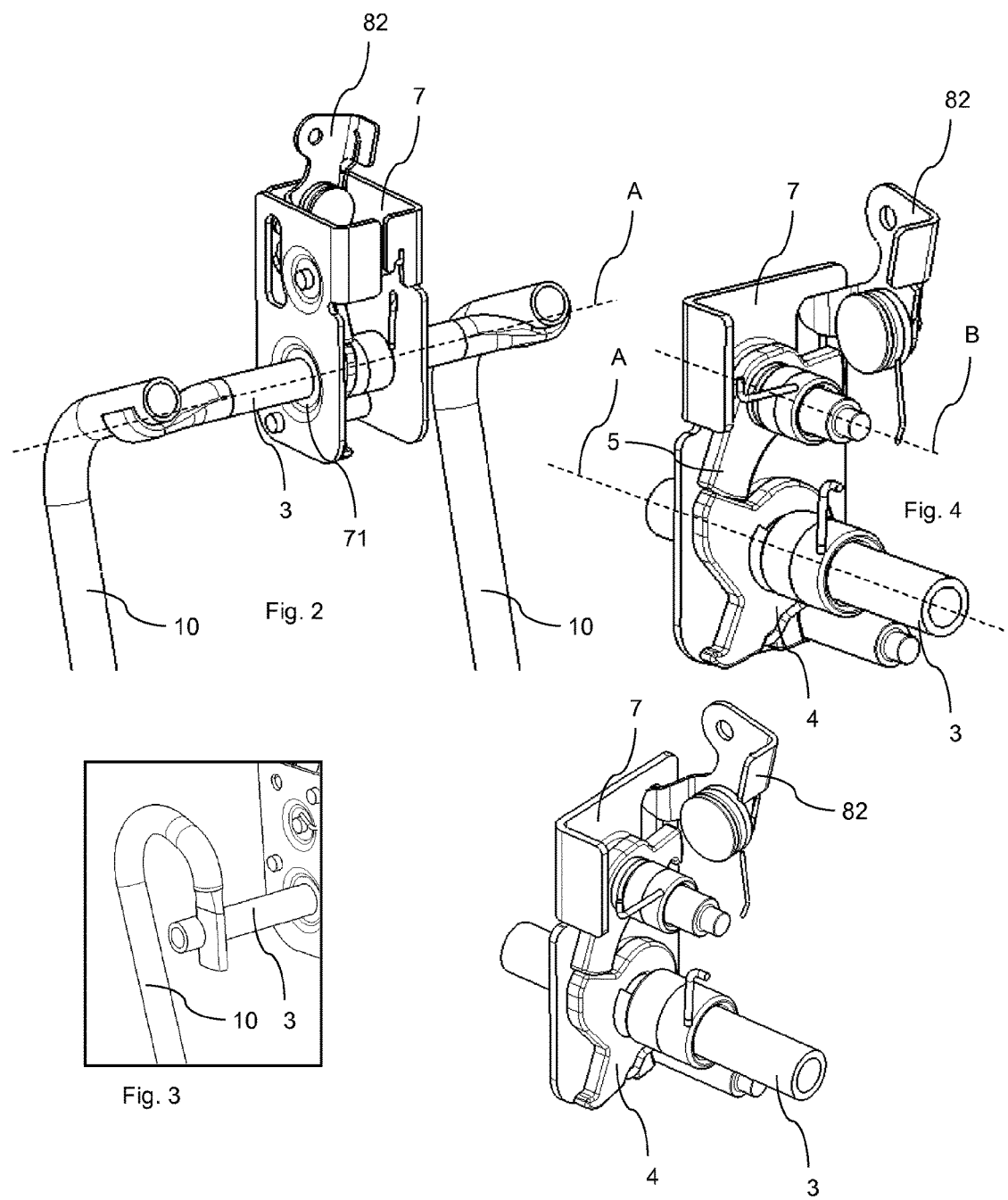

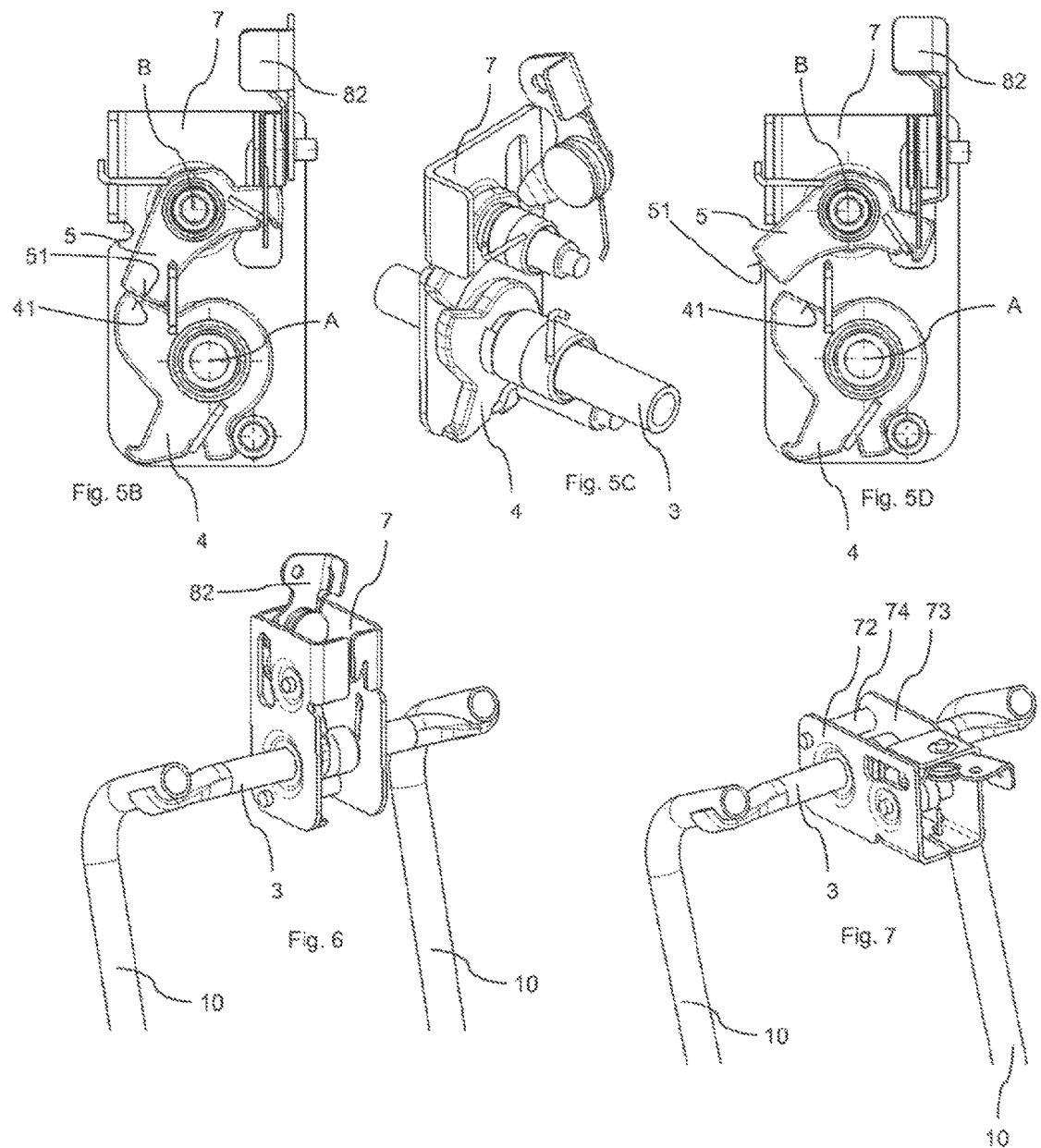

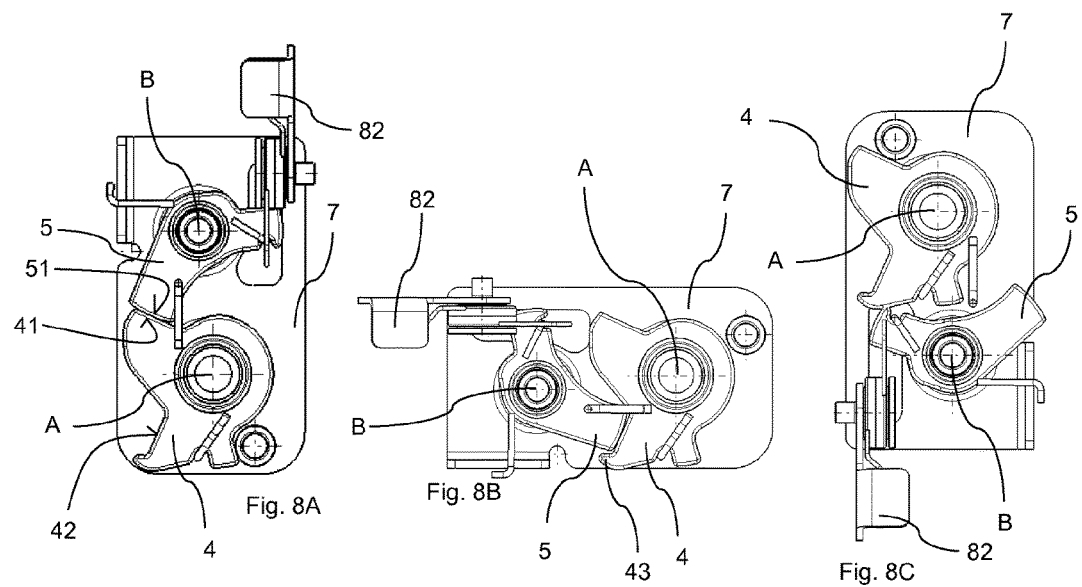

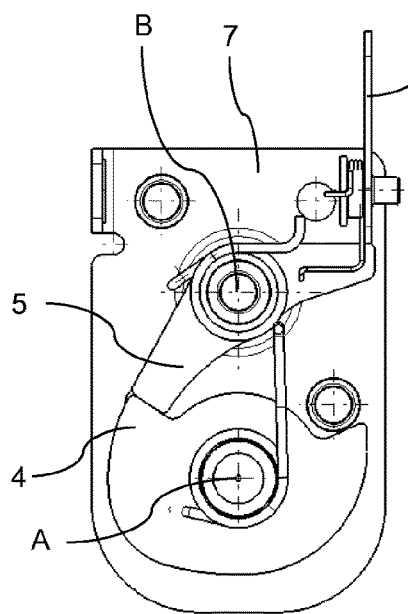
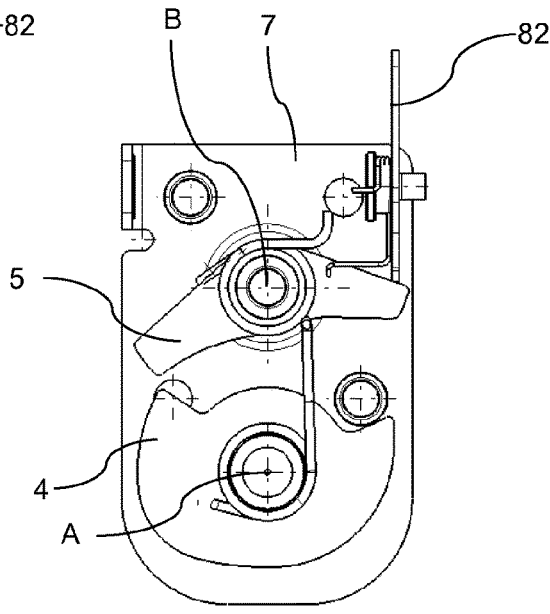
Fig. 12A
Fig. 12B
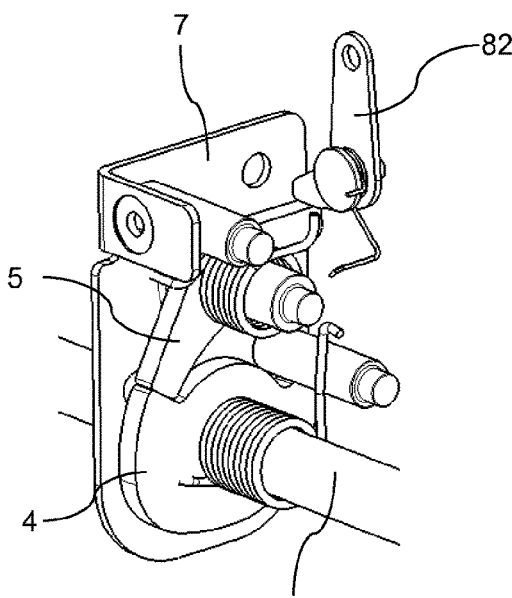
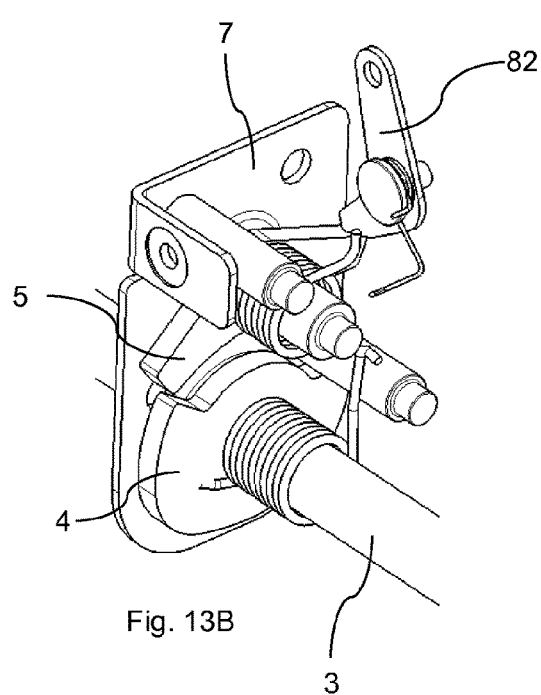
Fig. 13A
Fig. 13B

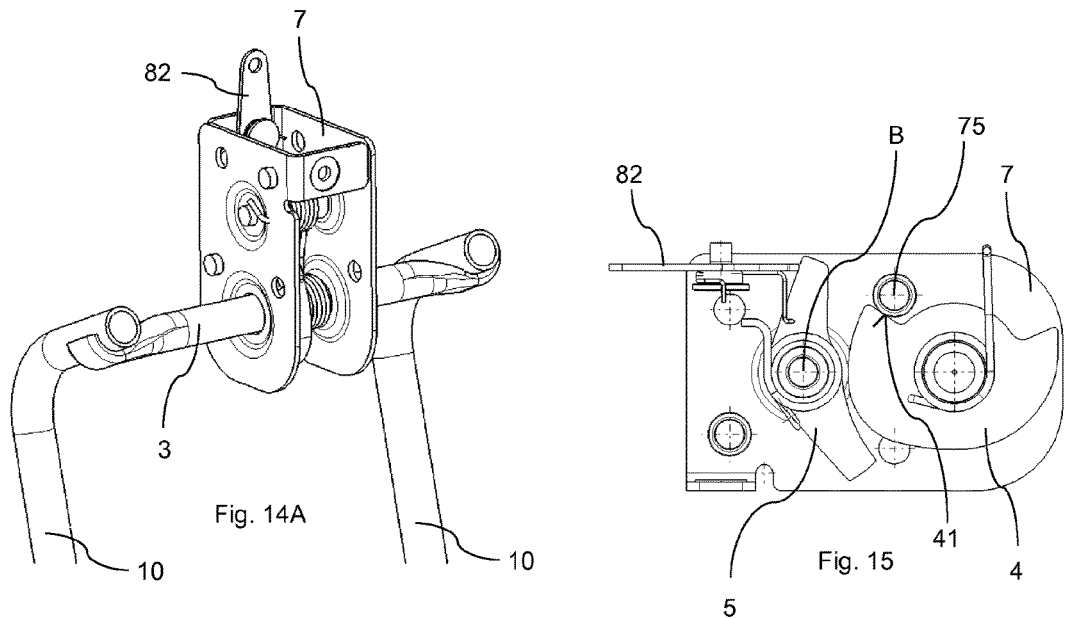
Fig. 14A
Fig. 15
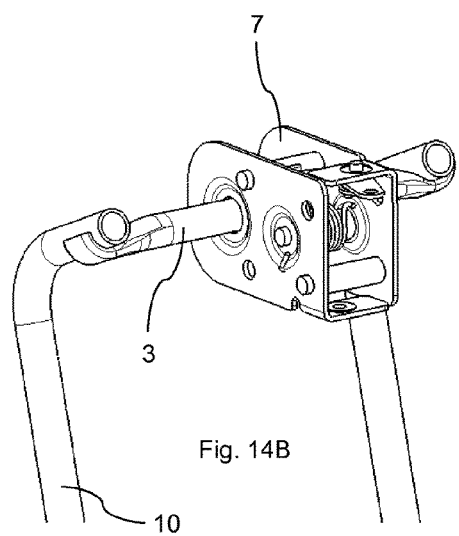
Fig. 14B

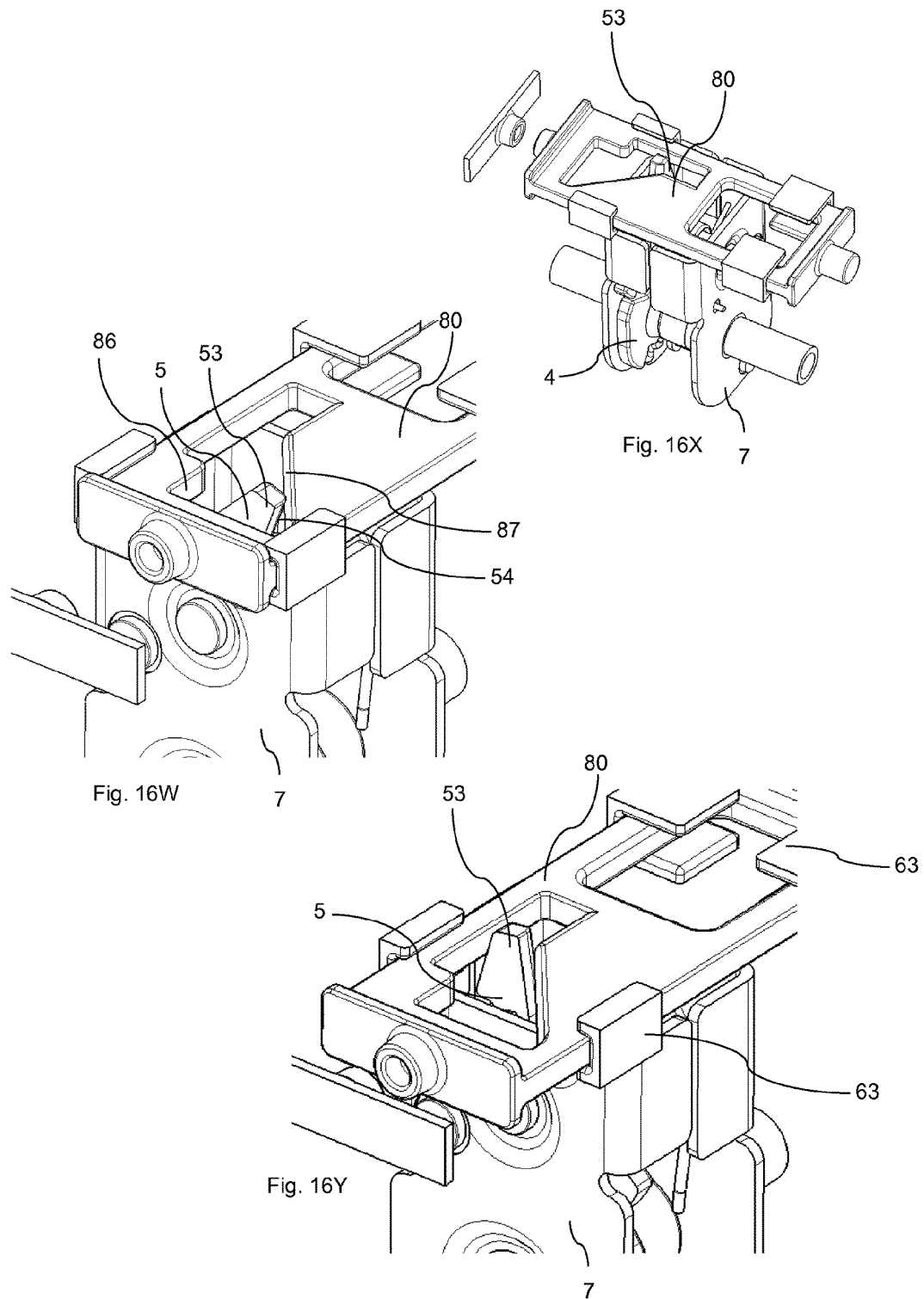

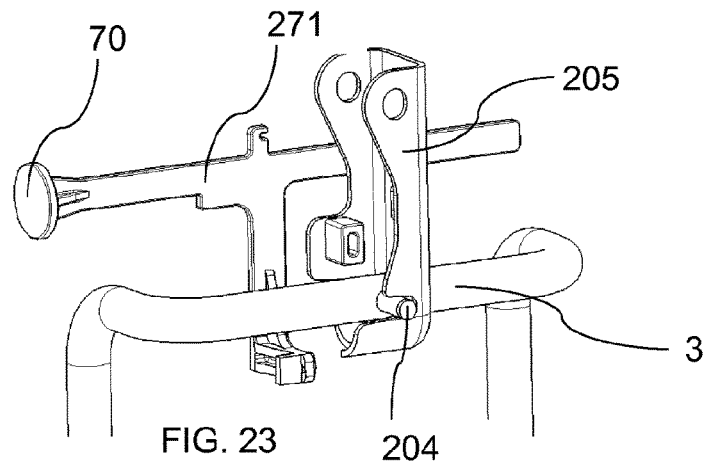
FIG. 23
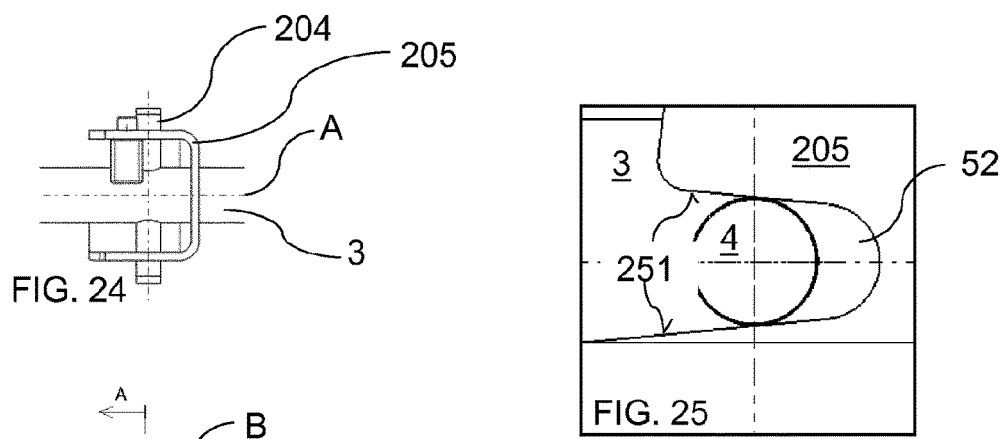
FIG. 24
FIG. 25
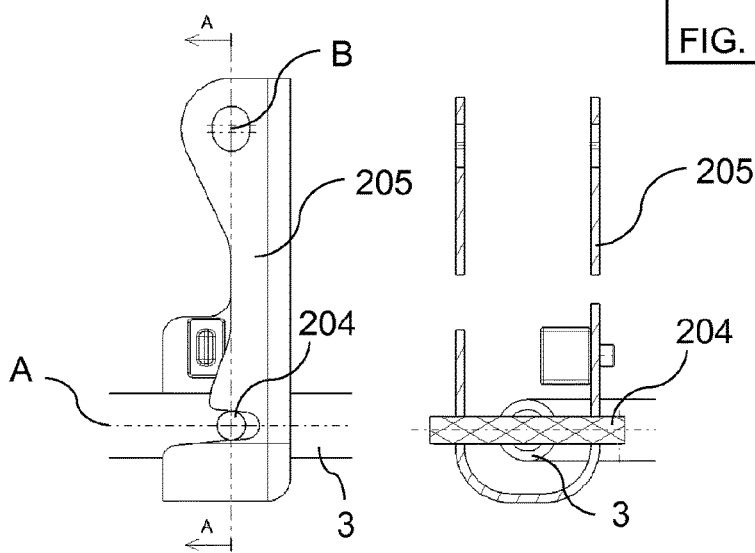
FIG. 26A  FIG. 26B

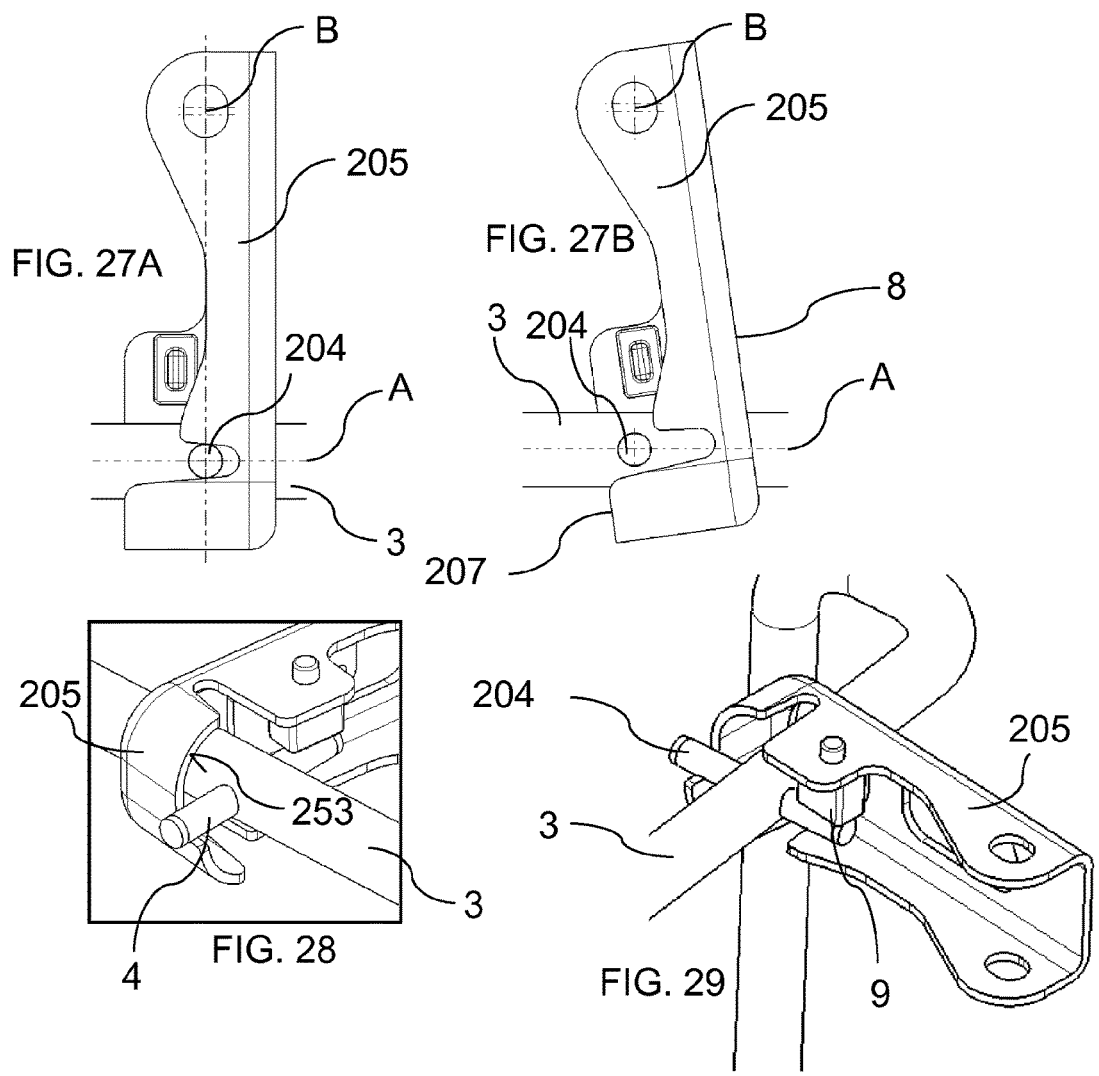
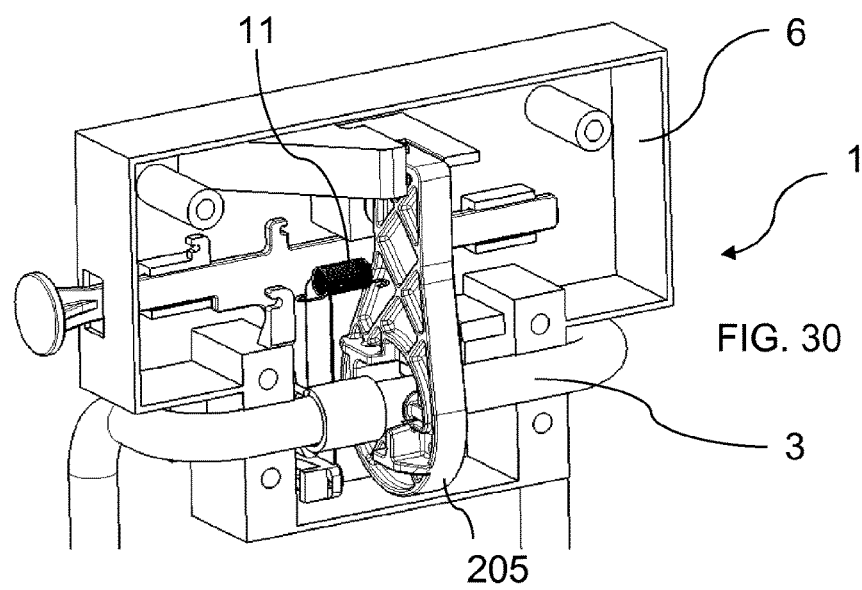

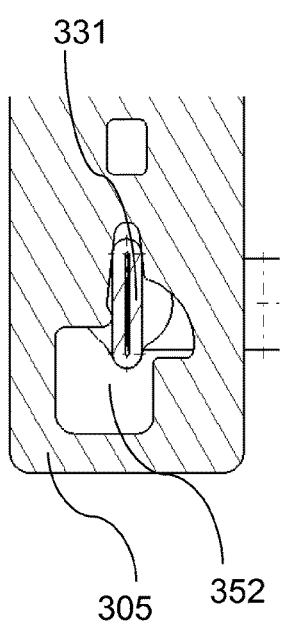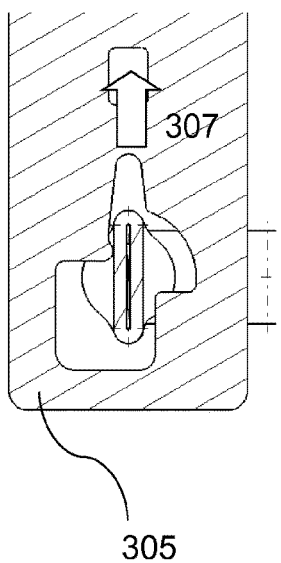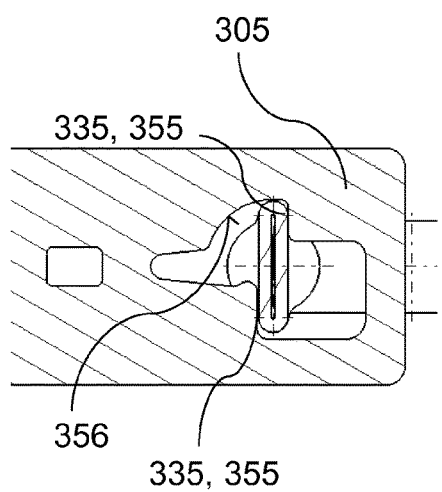
Fig. 48A
Fig. 48B
Fig. 48C

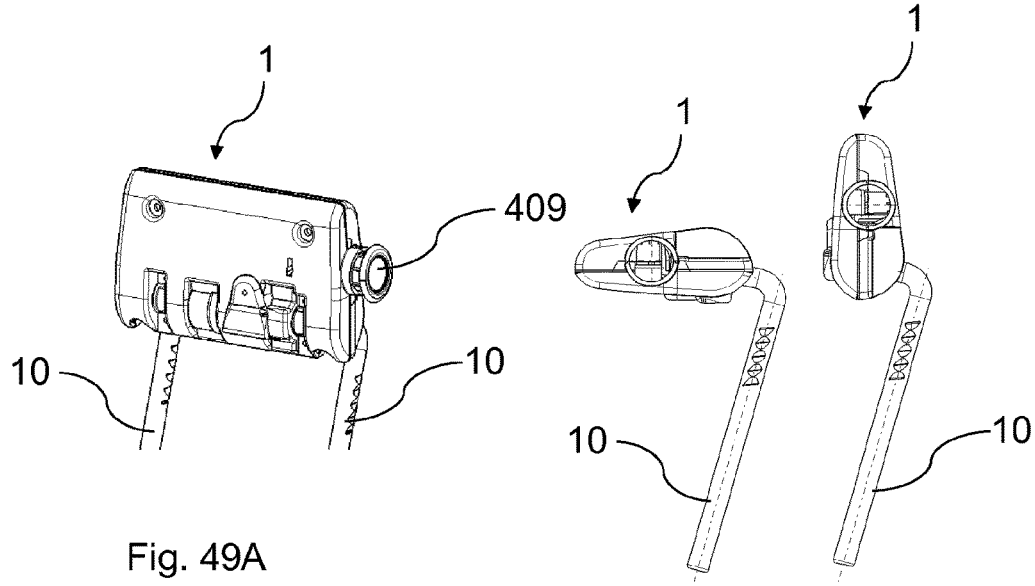
Fig. 49A
Fig. 49B
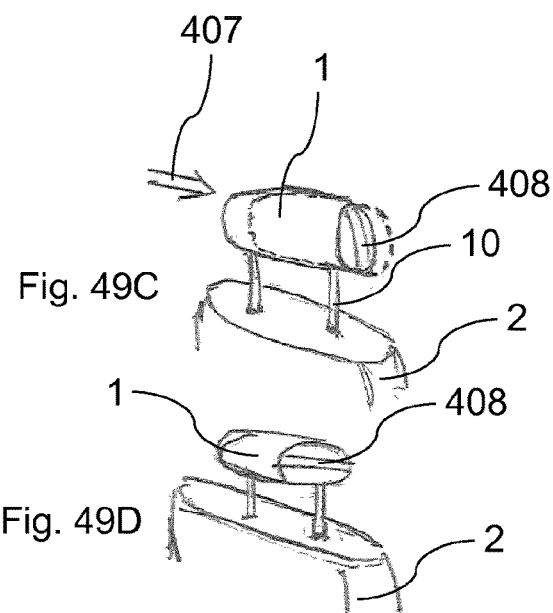
Fig. 49C
Fig. 49D

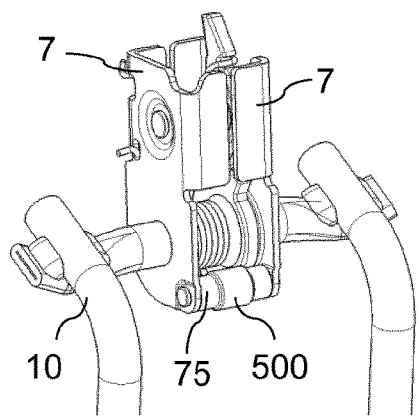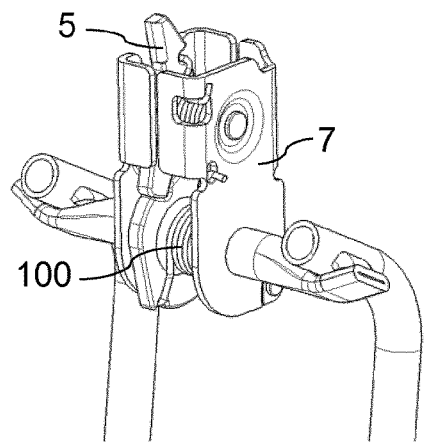
Fig. 52A　　　　　　Fig. 52B
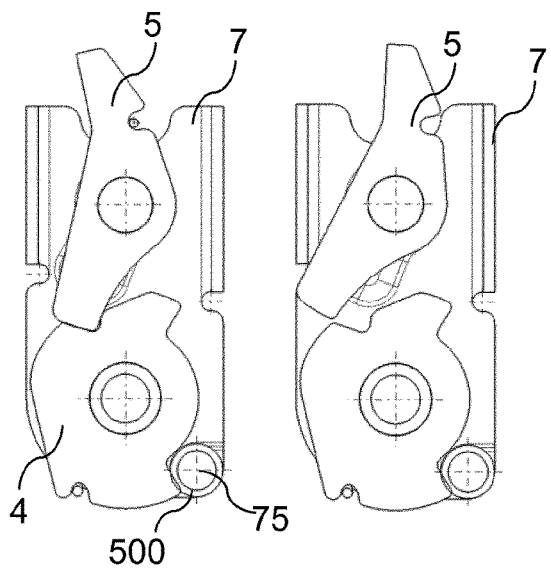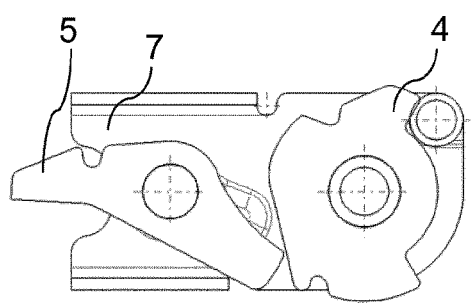
Fig. 52C　　Fig. 52D　　　　　Fig. 52E

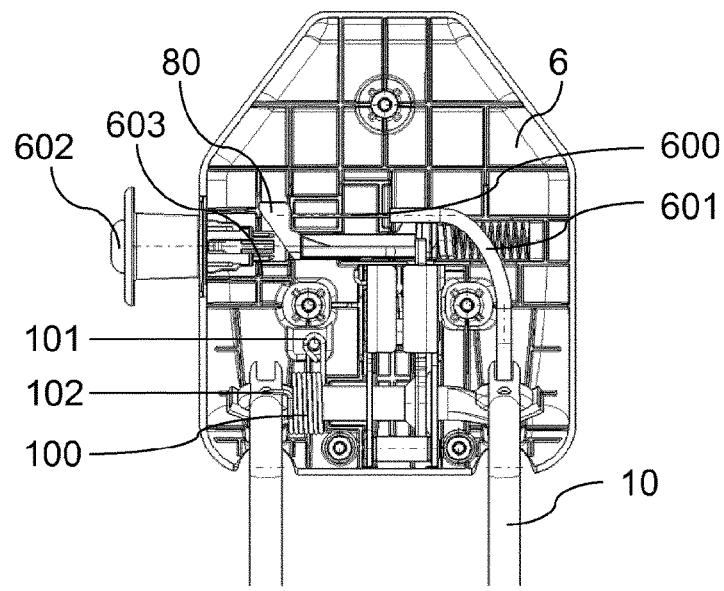
Fig. 53A
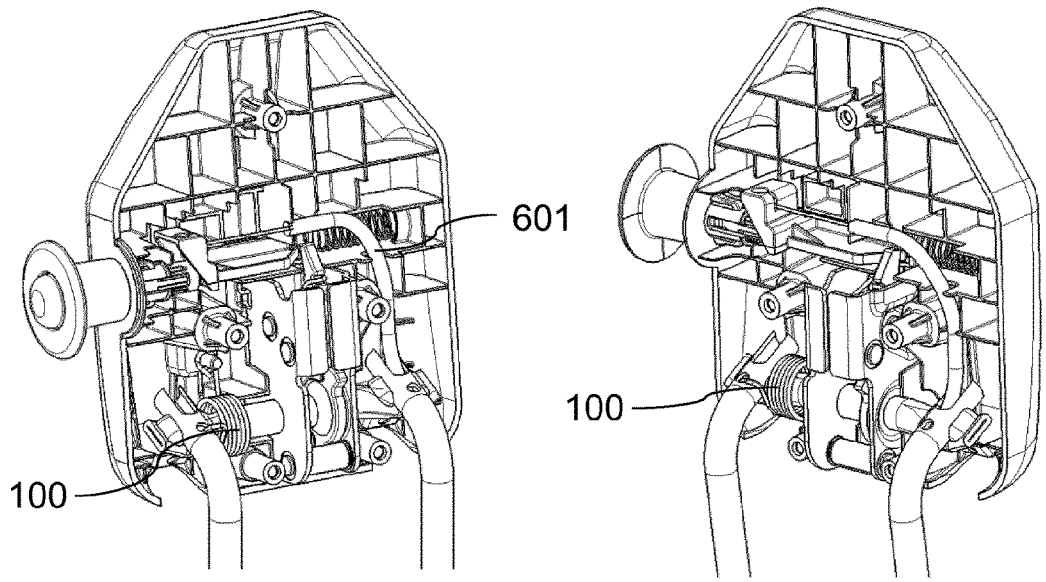
Fig. 53B
Fig. 53C

FOLDING HEAD RESTRAINT MECHANISM

BACKGROUND

The invention relates to a mechanism for folding a head restraint of a seat.

Mechanisms for folding head restraints of vehicle seats are generally known in the art. Document U.S. Pat. No. 7,422,280 B2 discloses a foldable headrest assembly, document US 2010/0327645 A1 discloses a headrest for cars and document U.S. Pat. No. 7,988,234 B2 discloses a headrest for a vehicle.

However, mechanisms for folding head restraints of the state of the art are of a comparably large extension, so that the geometry of the head restraint has to be adapted to the extension of the mechanical components, which results in a head restraint with reduced comfort or reduced esthetic appearance. Furthermore the comparably large extension of a head restraint with a state-of-the-art folding mechanism results in comparably high storage costs before the head restraint is mounted to the backrest of a seat.

SUMMARY

It is therefore an object of the present invention to provide an improved mechanism for folding a head restraint of a seat.

This object of the present invention is achieved by a mechanism for folding a head restraint for a backrest of a seat, in particular of a vehicle seat, comprising a head restraint and a cross portion, wherein the cross portion is fixed relative to the backrest, wherein the cross portion defines a first pivot axis, which the head restraint is pivoted about, wherein the cross portion comprises a locking disc, wherein the head restraint comprises a cam, wherein the cam is pivoted about a second pivot axis, wherein the head restraint is configured to be positioned in a usage-position relative to the cross portion and a storage-position relative to the cross portion, wherein the position of the head restraint is changeable between the usage-position and the storage-position by pivoting about the first pivot axis, wherein the cam is configured to be positioned in a locking-position relative to the head restraint and a releasing-position relative to the head restraint, wherein, when the cam acquires the locking-position and the head restraint acquires the usage-position, a first bearing surface, being a bearing surface of the cam, bears against and/or faces a second bearing surface, being a bearing surface of the locking disc, wherein the head restraint is locked in the usage-position when the head restraint acquires the usage-position and the cam acquires the locking-position, and wherein the head restraint is unlocked with respect to pivoting about the first pivot axis when the cam is in the releasing-position, characterized in that at least the cam and the locking disc are at least partly accommodated in at least one housing bracket.

Thereby the mechanical components of the mechanism for folding a head restraint, in particular the cam and the locking disc are placed in a confined space, thus the construction of further components of the head restraint is simplified.

According to a preferred embodiment of the present invention, at least the cam and the locking disc are at least partly accommodated in housing brackets.

Thereby the mechanical components of the mechanism for folding a head restraint, in particular the cam and the locking disc are placed in a confined space, thus the construction of further components of the head restraint is simplified. It is preferred that the volume of the housing brackets is small compared to the volume of the total head restraint, for example the volume of the housing brackets is less than 50%, furthermore preferred less than 20%, furthermore preferred less than 10%, furthermore preferred less than 5%, furthermore preferred less than 2%, of the volume of the total head restraint.

According to a preferred embodiment of the present invention, in a normal-use situation the first bearing surface has clearance to the second bearing surface. It is thereby advantageously possible that the cam can be moved from the locking-position to the releasing-position in a comfortable way, in particular with little force. A normal-use situation is a situation, wherein the head restraint acquires the usage-position, and no unusual high load bears against the head restraint. This is in contrast to for example an accident situation, wherein a high load due to acceleration forces of the head restraint or of a head of a vehicle occupant bears against the head restraint.

According to a preferred embodiment, in the following referred to as the first embodiment, the locking disc comprises a third bearing surface, wherein, when the cam acquires the locking-position and the head restraint acquires the storage-position, the first bearing surface bears against the third bearing surface preventing the head restraint from pivoting beyond the storage position. Thereby no additional components are needed for preventing the head restraint from pivoting beyond the storage position, since the cam and the locking disc are already used for locking the head restraint in the usage-position.

According to another preferred embodiment, in the following referred to as the second embodiment, the locking disc comprises a third bearing surface, wherein the housing brackets comprise a locking pin, and wherein, when the head restraint acquires the storage-position, the locking pin bears against the third bearing surface preventing the head restraint from pivoting beyond the storage position. Thereby the head restraint is prevented from pivoting beyond the storage position in a simple way. Especially it is possible to use a pin that is used for connecting parts of the housing brackets as locking pin. Thereby no additional components are needed for preventing the head restraint from pivoting beyond the storage position.

According to another preferred embodiment, in the following referred to as the third embodiment, the housing brackets comprise a locking pin, wherein, when the head restraint acquires the storage-position, the locking pin bears against the second bearing surface. It is thereby, compared to the second embodiment, advantageously possible that the shape of the locking disc is simplified, since no third bearing surface is needed.

It is preferred according to the first embodiment of the present invention, the third bearing surface comprises a hook-shaped protrusion preventing the first bearing surface from sliding off the third bearing surface. Thereby it is advantageously possible to avoid that the cam and another component of the mechanism get wedged.

According to a preferred embodiment of the present invention, the head restraint comprises a front and/or rear cover, wherein the front and/or rear cover have/has at least one contact portion that contacts the housing brackets. It is thereby advantageously possible that the head restraint can bear a high load.

According to a preferred embodiment of the present invention, the housing brackets accommodate a release link, wherein the release link is configured to bear against the cam when a force is applied to the release link. It is thereby advantageously possible to move the cam from the locking-position to the releasing-position by moving the release link.

It is preferred according to this embodiment that the release link is movable by a cable. It is thereby advantageously possible to move the cam from the locking-position to the releasing-position in a comfortable way, e.g. by actuation of an actuation means that pulls the cable.

It is furthermore preferred according to this embodiment that the release link is movable by a push button. It is thereby advantageously possible to move the cam from the locking-position to the releasing-position in a comfortable way by pushing the push button.

It is furthermore preferred according to this embodiment that the release link is movable by a strap. It is thereby advantageously possible to move the cam from the locking-position to the releasing-position in a comfortable way by pulling the strap.

According to a preferred embodiment of the present invention, the housing brackets comprise a pivot bearing surface for bearing the cross portion. Thereby further components of the head restraint, in particular a cover of the head restraint, do not need to comprise pivot bearing surfaces for bearing the cross portion, since it is possible to firmly fix the further components of the head restraint, in particular a cover of the head restraint, to the housing brackets.

According to a preferred embodiment of the present invention, the backrest comprises at least two support posts, wherein the cross portion is fixed to the support posts. Thereby it is possible to place the head restraint in a distance from the backrest such that the position of the head restraint is adapted to the body size of an occupant of the seat.

It is preferred according to this embodiment that the cross portion is welded to the support posts. Thereby the cross portion is able to bear a high torque.

According to a preferred embodiment of the present invention, the head restraint is biased by a spring. Thereby it is possible to bias the head restraint either in the direction of the usage-position or in the direction of the storage-position. Preferably, the head restraint is biased by the spring in the direction of the storage-position.

It is furthermore preferred according to this embodiment that the spring is directly connected to a front and/or rear cover of the head restraint. Thereby, the spring can advantageously be fixed at the head restraint without directly connecting to the at least one housing bracket.

It is furthermore preferred according to this embodiment that at least one housing bracket is arranged between the spring and the locking disc. It is thereby advantageously possible to position the spring outside the confined space in which the cam and the locking disc are placed in. Thus, interferences with the cam and the locking discs can be avoided.

It is furthermore preferred according to this embodiment that the spring is directly connected to one of the support posts and directly connected to a front and/or rear cover of the head restraint. Thereby, the spring can advantageously rotate the head restraint relative to the backrest without the need to connect the spring to either the locking disc or the at least one housing bracket.

It is furthermore preferred according to this embodiment that the spring is directly connected to the locking disc and directly connected to a front and/or rear cover of the head restraint. Thereby, the spring can advantageously rotate the head restraint relative to the backrest without the need to connect the spring to the at least one housing bracket.

According to a preferred embodiment of the present invention, the housing brackets are connected with pins. It is thereby advantageously possible to assemble the assembly consisting of at least the housing brackets, the cam, the locking disc and at least a segment of the cross portion.

According to this embodiment, it is preferred that the connection pins are riveted on two sides. It is thereby advantageously possible that the housing brackets are reliably mounted one to the other.

According to a preferred embodiment of the present invention, the head restraint comprises a wedge release, wherein the wedge release is configured to bear against an arm of the cam when a force is applied to the wedge release. It is thereby advantageously possible to transmit a force from an actuation means, e.g. a cable, a push button or a strap, to the cam to move the cam from the locking position to the releasing position.

According to this embodiment, it is preferred that the arm of the cam comprises a first arced surface, wherein the first arced surface bears against the wedge release. Thereby it is advantageously possible that the arm of the cam contacts the wedge release without scratching a surface of the wedge release, since no sharp edge of the cam contacts the wedge release.

According to this embodiment, it is furthermore preferred that a button post of a push button is connected to the wedge release. Thereby it is advantageously possible that a push button moves the wedge release.

According to this embodiment, it is furthermore preferred that the wedge release is able to acquire a further locking-position and a further releasing-position, wherein the wedge release is movable from the further locking-position to the further releasing-position by a translational movement, and wherein the wedge release is configured to move the cam from the locking-position to the releasing-position by moving from the further locking-position to the further releasing-position. It is thereby possible to translate a movement of the wedge release from the further locking-position to the further releasing-position into a movement of the cam from the locking-position to the releasing-position.

According to this embodiment, it is preferred that the wedge release comprises a blocking-surface configured to prevent the cam from moving from the locking-position to the releasing-position when the wedge release acquires the further locking-position. It is thereby advantageously possible to increase the safety of the vehicle seat since an unwanted movement of the cam form the locking-position to the releasing position allows an unwanted movement of the head restraint from the usage-position to the storage-position, which might cause injuries to an occupant of the seat.

According to this embodiment, it is furthermore preferred that the wedge release comprises a second arced surface, wherein the second arced surface bears against the arm of the cam. Thereby it is advantageously possible that the wedge release contacts the arm of the cam without scratching a surface of the arm of the cam, since no sharp edge of the wedge contacts the cam.

According to this embodiment, it is furthermore preferred that the wedge release comprises a spring, wherein the spring pushes the push button against a stop. It is thereby advantageously possible that the wedge release is biased in the direction of the further locking position, thus freeplay is reduced and tolerances can be compensated. Furthermore thereby the wedge release returns to the further locking-position automatically.

According to this embodiment it is furthermore preferred that the wedge release comprises a first wedge that is configured to move the cam from the locking-position to the releasing-position by moving the wedge release from the further locking-position to the further releasing-position and a second wedge that is configured to move the cam from the releasing-position to the locking-position by moving the wedge release from the further releasing-position to the further locking-position. Thereby, it is advantageously possible to move the cam back and forth between the locking-position and the releasing-position without the need for biasing the cam in the direction of either the locking-position or the releasing-position.

According to this embodiment, it is preferred that the head restraint comprises a front and/or rear cover, wherein the front and/or rear cover comprise/comprises guides, and wherein the guides of the front and/or rear cover are configured to retain the wedge release and allow the translational movement of the wedge release. Thereby the wedge release moves from the further locking-position to the further releasing-position in a well-defined manner.

According to this embodiment it is preferred, that the front and/or rear cover and the wedge comprise features configured to retain the spring. Thereby the spring is reliably retained at its position.

According to another aspect of the invention the object of the invention is achieved by a mechanism for folding a head restraint for a backrest of a seat, in particular of a vehicle seat, comprising a head restraint and a cross portion, wherein the cross portion is fixed relative to the backrest, wherein the cross portion defines a first pivot axis, which the head restraint is pivoted about, wherein the cross portion comprises at least one locking pin, wherein the head restraint comprises a latch, wherein the latch is pivoted about a second pivot axis, wherein the head restraint is configured to be positioned in a usage-position relative to the cross portion and a storage-position relative to the cross portion, wherein the position of the head restraint is changeable between the usage-position and the storage-position by pivoting about the first pivot axis, wherein the latch is configured to be positioned in a locking-position relative to the head restraint and a releasing-position relative to the head restraint, wherein, when the latch acquires the locking position and the head restraint acquires the usage-position, at two bearing surfaces of at least one notch of the latch bear against the locking pin, wherein the head restraint is locked in the usage-position, when the head restraint acquires the usage position and the latch acquires the locking-position, and wherein the head restraint is unlocked with respect to pivoting about the first pivot axis, when the latch is in the releasing-position, characterized in that the bearing surfaces of the notch of the latch are inclined one related to the other such that the loosening of the locking pin relative to the bearing surfaces is reduced upon the latch acquiring the locking position.

It is thereby advantageously possible to provide a reliable contact between the bearing surfaces of the latch and the locking pin, without the need to provide particularly small tolerances, since tolerances of the diameter of the locking-pin can be compensated by varying the position of the latch relative to the locking pin by providing inclined bearing surfaces of the notch of the latch.

According to a preferred embodiment of the present invention, the second pivot axis is movable. This can be realized e.g. by providing a bold defining the second pivot axis, wherein the bold is mounted in a bearing hole of a cover of the head restraint and/or of the latch, which is in at least one direction larger that the bold, such that the bold is movable in this direction, thus the second pivot axis is movable. Alternatively this can be realized by defining the second pivot axis by placing a portion of the latch between bearing surfaces of a cover of the head restraint, such that the latch is movable. Thereby it is advantageously possible that tolerances can be compensated by varying the position of the second pivot axis.

It is preferred that the second axis is movable in a direction perpendicular to the first pivot axis and perpendicular to the second pivot axis. Thereby it is advantageously possible that tolerances of the location of the locking pin can be compensated by varying the position of the second pivot axis.

According to a preferred embodiment of the present invention, the second pivot axis is oriented perpendicular to the first pivot axis. Thereby it is advantageously possible that in the locking-position the latch is supported by the bearing of the second pivot axis when locking the head restraint with regard to a rotation about the first pivot axis. Thus by orienting the second pivot axis perpendicular to the first pivot axis, when the latch acquires the locking-position and the head restraint acquires the usage-position and a force is applied to the head restraint in the direction of the storage-position, no force is applied to the latch in the direction of the releasing-position.

According to a preferred embodiment of the present invention, the locking pin is oriented perpendicular to the first pivot axis and perpendicular to the direction which the second pivot axis is movable in. Thereby it is advantageously possible that the locking pin protrudes from the cross portion and provides a tight fit with the latch when the latch acquires the locking-position.

According to an alternative preferred embodiment of the present invention, the locking pin is oriented perpendicular to the first pivot axis and parallel to the direction which the second pivot axis is movable in. Thereby it is advantageously possible that tolerances of the distance between the first pivot axis and the second pivot axis are compensated by varying the position of the latch parallel to the locking pin.

According to a preferred embodiment of the present invention, the second pivot axis is movable due to tolerances of bearing means of the second pivot axis. Thereby it is advantageously possible that the latch is reliably mounted and tolerances of the location of the locking pin can be compensated by varying the position of the second pivot axis.

According to a preferred embodiment of the present invention, the cross portion comprises two locking pins, particularly arranged on opposing sides of the cross portion. Thereby it is advantageously possible that the head restraint can bear a high torque with respect to the first pivot axis when the latch acquires the locking-position.

According to a preferred embodiment of the present invention, the locking pin of the cross portion protrudes at two opposing sides of the cross portion. Thereby it is advantageously possible that the locking pin is able to bear against two surfaces of the locking pin provided on opposing sides of the cross portion, and thus it is possible, that a single locking pin can bear a high torque with respect to the first pivot axis when the latch acquires the locking-position.

According to a preferred embodiment of the present invention, a cover of the head restraint supports at least one side of the latch. It is thereby advantageously possible that a torque bearing on the head restraint when the head restraint is in the usage-position and the latch is in the locking-position does not damage the bearing of the latch, e.g. the bearing of the latch bight be a bolt defining the second pivot axis. According to this embodiment it is preferred that the cover of the head restraint supports two sides of the latch. For example it is possible that the cover consists of a front part and a rear part, wherein the front part supports a first side of the latch and the rear part supports a second side of the latch.

According to a preferred embodiment of the present invention, during normal operation. i.e. when no or a medium torque bears against the head restraint with respect to the second pivot axis, there is clearance between the cover of the head restraint and the latch. It is thereby advantageously possible that the latch can freely pivot between the locking-position and the releasing-position.

According to a preferred embodiment of the present invention, the locking pin is press fit into holes of the cross portion. It is thereby advantageously possible that the locking pin is reliably fixed to the cross portion. It is possible that the locking pin is a solid locking pin, i.e. the locking pin does not comprise any cavity. Alternatively it is possible to use a locking pin that is not solid, e.g. a roll pin.

According to a preferred embodiment of the present invention, the cross portion is a tube, particularly a metal tube. It is thereby advantageously possible that the weight of the cross portion is reduced compared to a solid material cross portion.

According to a preferred embodiment of the present invention, the latch exhibits a push point, wherein the latch is configured to move from the locking-position to the releasing-position when a compression force is applied to the push point. It is thereby advantageously possible to move the latch from the locking-position to the releasing-position by applying a compression force. e.g. by actuation of an actuation button.

According to a preferred embodiment of the present invention, the latch exhibits a pull point, wherein the latch is configured to move from the locking-position to the releasing-position, when a pulling force is applied to the pull point. It is thereby advantageously possible to move the latch from the locking-position to the releasing-position by applying a pulling force, e.g. by a strap or a Bowden cable.

According to a preferred embodiment of the present invention, the locking pin or the plurality of locking pins is/are configured to contact at least one stop, preferably two stops, when the head restraint acquires the storage position. It is thereby advantageously possible to prevent the head restraint from pivoting beyond the storage position.

According to a preferred embodiment of the present invention, the stop is fixed to the latch and the stop comprises rubber and/or plastic. It is thereby advantageously possible to prevent buzz, squeak and rattle (BSR) concerns.

According to a preferred embodiment of the present invention, the latch comprises a further bearing surface configured to bear against the locking pin when the head restraint acquires the storage-position to prevent the latch from moving from the releasing-position in the locking-position. It is thereby advantageously possible to move the head restraint from the storage-position to the usage-position without actuation of a releasing means.

According to a preferred embodiment of the present invention, the latch is an overmolded part, comprising a plate, preferably a steel plate, and an overmolding material. It is thereby advantageously possible to manufacture the latch with a high resilience in a cost-effective way.

According to a preferred embodiment of the present invention, the locking pin is tapered. It is thereby advantageously possible to provide a large contact area between the locking pin and the bearing surfaces of the latch, since the bearing surfaces of the latch are inclined one related to the other.

According to a preferred embodiment of the present invention, a cover of the head restraint comprises a pivot contact feature configured to contact the latch such that the second pivot axis is defined. It is thereby advantageously possible to omit a bolt defining the second pivot axis, thus reducing the number of members.

It is preferred that the pivot contact feature of the cover is configured to provide enough degrees of freedom to the latch to accommodate tolerance variation to the locking pin such that the second pivot axis is movable. It is thereby advantageously possible to compensate tolerances.

It is furthermore preferred that a lock spring pulls the latch against the pivot contact feature. It is thereby advantageously possible to avoid a vibrational movement of the latch with respect to the clearance of the bearing of the latch.

According to a preferred embodiment of the present invention, the locking pin comprises a cap. It is thereby advantageously possible to provide a well-defined position of the locking pin with respect to the cross portion, since the cap of the locking pin effects a hard stop during the installation of the locking pin.

According to another aspect of the invention the object of the invention is achieved by a mechanism for folding a head restraint for a backrest of a seat, in particular of a vehicle seat, comprising a head restraint and a cross tube, wherein the cross tube is fixed relative to the backrest, wherein the cross tube defines a pivot axis, which the head restraint is pivoted about, wherein the cross tube comprises a flattened segment, wherein the head restraint comprises a lock plate, wherein the lock plate is displaceable, wherein the head restraint is configured to be positioned in a usage-position relative to the cross tube and a storage-position relative to the cross tube, wherein the position of the head restraint is changeable between the usage-position and the storage-position by pivoting about the pivot axis, wherein the lock plate is configured to be positioned in a locking-position relative to the head restraint and a releasing-position relative to the head restraint, wherein when the lock plate acquires the locking-position and the head restraint acquires the usage-position, at least one first bearing surface, being a bearing surface of the lock plate, bears against and/or faces at least one second bearing surface, being a bearing surface of the flattened segment of the cross tube, wherein the head restraint is locked in the usage-position, when the head restraint acquires the usage-position and the lock plate acquires the locking-position, and wherein the head restraint is unlocked with respect to pivoting about the pivot axis, when the lock plate is in the releasing-position.

It is thereby advantageously possible to provide a mechanism for folding a head restraint for a backrest of a seat which consists of a comparably small number of components compared to the state of the art. This is achieved according to the present invention due to the fact that a surface of the lock plate bears against a surface of the cross tube, so that no additional locking devices that would be fixed to the cross tube are needed.

According to a preferred embodiment of the present invention the position of the lock plate is changeable between the locking-position and the releasing-position by a translational movement in a sliding direction. It is thereby advantageously possible that the lock plate is actuated by an actuating mechanism in a simple manner.

According to a preferred embodiment of the present invention the cross tube comprises a second segment and a third segment, wherein the flattened segment has a first cross section, wherein the second segment has a second cross section, wherein the third segment has a third cross section, wherein the flattened segment is arranged between the second segment and the third segment, wherein the first cross section differs from the second cross section and wherein the first cross section differs from the third cross section. It is thereby advantageously possible to adopt the shape of the first cross section to the shape of the lock plate, such that at least one bearing surface of the lock plate bears against and/or faces at least one bearing surface of the flattened segment of the cross tube.

It is preferred according to this embodiment that the second cross section and the third cross section both have rotational symmetry, wherein the first cross section lacks rotational symmetry. It is thereby advantageously possible that surfaces of the second segment and surfaces of the third segment act as bearing surfaces for pivoting the head restraint about the pivot axis, while surfaces of the flattened segment prevent the head restraint from rotating when the lock plate is in the locking-position.

It is furthermore preferred according to this embodiment that the position of the lock plate is changeable between the locking-position and the releasing-position by a translational movement in a sliding direction, wherein the extension of the flattened segment of the cross tube in a direction perpendicular to the pivot axis and perpendicular to the sliding direction is less than 50%, preferably less than 20%, of the extension of the second segment in a direction perpendicular to the axis and perpendicular to the sliding direction. It is thereby advantageously possible that, when the lock plate acquires the locking-position and the head restraint acquires the usage-position, the head restraint is locked in the usage-position in a reliable way.

According to a preferred embodiment of the present invention the head restraint comprises a cover. It is thereby advantageously possible that cushion elements can be mounted to the head restraint, thereby increasing the comfort of an occupant of the seat which comprises a backrest which the head restraint is mounted to. It is preferred according to this embodiment that the cover consists of a front part and a rear part.

It is preferred according this embodiment that the cover comprises pivot axis bearing surfaces bearing the second segment and the third segment of the cross tube defining the pivot axis. It is thereby advantageously possible that a pivot axis is defined without an additional component such as a bold. It is preferred according to this embodiment that the cover consists of a front part and a rear part, wherein the front part comprises pivot axis bearing surfaces and the rear part comprises pivot axis bearing surfaces.

It is furthermore alternatively or additionally preferred according to this embodiment that the cover comprises support walls supporting the lock plate. It is thereby advantageously possible that the lock plate moves in a well-defined manner between the locking-position and the releasing-position. It is preferred according to this embodiment that the cover consists of a front part and a rear part, wherein the front part comprises at least one support wall supporting a first side of the lock plate and wherein the rear part comprises at least one support wall supporting a second side of the lock plate.

According to a preferred embodiment of the present invention, the head restraint comprises rubber bumpers bearing against a member fixed relative to the cross tube or bearing against a portion of the cross tube or bearing against the cross tube when the head restraint acquires the usage-position such that freeplay of the head restraint relative to the backrest in a direction to a position beyond the usage-position is reduced. Thereby vibrations of the head restraint are reduced.

According to a preferred embodiment of the present invention, three first bearing surfaces bear against and/or face each one second bearing surface. It is thereby advantageously possible that the first bearing surfaces and the second bearing surfaces can bear a comparably high load compared to a single first bearing surface bearing against and/or facing a single second bearing surface.

It is preferred according to this embodiment that, when the head restraint is in the usage-position, at least a part of the first bearing surfaces, preferably exactly one first bearing surface, removes freeplay of the head restraint with respect to rotation in the direction of the storage-position. Thereby vibrations of the head restraint are reduced.

According to a preferred embodiment of the present invention, the cross tube extends through a recess of the lock plate. Thereby the lock plate is secured in the locking-position, in the releasing-position or in an intermediate position.

It is preferred according to this embodiment that the recess of the lock plate is of an extension such that the second segment and/or the third segment of the cross tube fits through the recess of the lock plate. It is thereby advantageously possible to move portions of the cross tube through the recess of the lock plate during assembly of the head restraint.

According to a preferred embodiment of the present invention, when the head restraint acquires the storage-position, two third bearing surfaces, being bearing surfaces of the lock plate, bear against and/or face two fourth bearing surfaces, being bearing surfaces of the flattened segment of the cross tube. Thereby the head restraint is prevented from pivoting beyond the storage position.

According to a preferred embodiment of the present invention, a fifth bearing surface, being a bearing surface of the lock plate, bears against the flattened segment of the cross tube, such that the lock plate is prevented from moving from the releasing-position to the locking-position when the head restraint is in a position between the usage-position and the storage-position or in the storage-position. Thereby the head restraint is movable from the storage-position or a position between the storage-position and the usage-position to the usage-position without actuation of an actuation means moving the lock plate.

According to a preferred embodiment of the present invention, the lock plate is biased in the direction of the locking-position. Thereby freeplay of the lock plate is reduced and, when the lock plate acquires the locking-position, the lock plate is reliably retained in the locking-position.

According to another aspect of the invention the object of the invention is achieved by a mechanism for folding a head restraint for a backrest of a seat, in particular of a vehicle seat, comprising a head restraint and a cross portion, wherein the cross portion is fixed relative to the backrest, wherein the cross portion defines an axis, which the head restraint is pivoted about, wherein the head restraint is configured to be positioned in a usage-position relative to the cross portion and a storage-position relative to the cross portion, wherein the position of the head restraint is changeable between the usage-position and the storage-position by pivoting about the axis, wherein the head restraint is translationally moveable parallel to the axis, wherein the head restraint is configured to be positioned in a locking-position relative to the backrest and a releasing-position relative to the backrest, wherein the position of the head restraint is changeable between the locking-position and the releasing-position by a translational movement of the head restraint parallel to the axis, characterized in that, when the head restraint acquires the locking-position and the usage-position, the head restraint is locked in the usage-position.

It is thereby advantageously possible that no actuation means with a complicated mechanism is necessary such as a push button or a Bowden cable, thus the number of components is reduced.

According to a preferred embodiment of the present invention, the head restraint comprises a strap. It is thereby advantageously possible to move the head restraint from the locking-position to the releasing-position in a comfortable way by pulling the strap. Preferably the strap is fixed to the head restraint and/or to a cover of the head restraint.

According to a preferred embodiment of the present invention, the cross portion is supported by support posts, wherein the support posts extent through slots of the head restraint, wherein the slots are configured to allow the movement of the head restraint from the locking-position to the releasing-position. It is thereby possible that the locking mechanism is accommodated in the head restraint.

According to a preferred embodiment of the present invention, the cross portion comprises a first locking element and the head restraint comprises a second locking element, wherein the first locking element bears against and/or faces the second locking element when the head restraint acquires the locking-position and wherein the first locking element does not bear against and/or face the second locking element when the head restraint acquires the releasing-position. It is thereby advantageously possible that the head restraint is locked in a reliable manner when the head restraint acquires the locking-position.

According to a preferred embodiment of the present invention, the first locking element is a locking pin and the second locking element is a locking plate. It is thereby advantageously possible that the first locking element and the second locking element can be manufactured in a simple way.

According to this embodiment, it is preferred that the locking plate comprises a recess, wherein the locking pin is located inside the recess when the head restraint acquires the locking-position. It is thereby advantageously possible to provide bearing surfaces of the locking plate which bear against the locking pin when the head restraint acquires the locking-position.

According to a preferred embodiment of the present invention, the head restraint comprises a spring, which biases the head restraint in the direction of the locking-position by applying a compression force to the head restraint. Thereby it is advantageously possible to prevent the head restraint from moving unintentionally from the locking-position to the releasing-position. An unintentional movement of the head restraint from the locking-position to the releasing-position would allow the head restraint to move unintentionally from the usage-position to the storage-position, which would possibly cause injuries to an occupant of the seat.

According to this embodiment it is preferred, that the spring biases the head restraint in the direction of the storage-position by applying a torsional force to the head restraint. It is thereby advantageously possible to prevent the head restraint from unintentionally moving from the storage-position to the usage-position. This is especially useful in an embodiment, wherein it is not possible to lock the head restraint in the storage-position.

BRIEF DESCRIPTION OF THE DRAWINGS

FIGS. 2 to 8C show embodiments of a head restraint according to the first embodiment.

FIGS. 9 to 15 show embodiments of a head restraint according to the third embodiment.

FIG. 23 shows a perspective view similar to FIG. 22 with further components of the head restraint omitted for illustrative purposes.

FIG. 24 shows a detail of a top view of the head restraint mechanism according to the ninth embodiment of the present invention.

FIG. 25 shows a detail of a front view of the head restraint mechanism according to the ninth embodiment.

FIG. 26A shows a detail of a front view of the head restraint mechanism similar to FIG. 25 but illustrating a larger field of view, defining a plane A-A.

FIG. 26B shows a cross of the plane A-A of FIG. 26A.

FIGS. 27A and 27B show the latch according to the ninth embodiment in the locking-position and in the releasing-position, respectively.

FIGS. 28 and 29 show details of perspective views of the head restraint mechanism according to the ninth embodiment, the head restraint acquiring the storage-position.

FIG. 30 shows a perspective view similar to FIG. 22, illustrating a tenths embodiment of the latch.

FIGS. 48A to 48C show the lock plate acquiring different positions relative to the cross tube.

FIG. 49A shows a vehicle seat in a perspective view.

FIG. 49B shows a vehicle seat in a side view.

FIGS. 49C and 49D shows a vehicle seat according to the present invention in a perspective view.

FIG. 52A to 52E show a head restraint according to a variation of the third embodiment.

FIG. 53A to 53C show a head restraint according to a variation of the fifth embodiment.

DETAILED DESCRIPTION

Figure 1A:
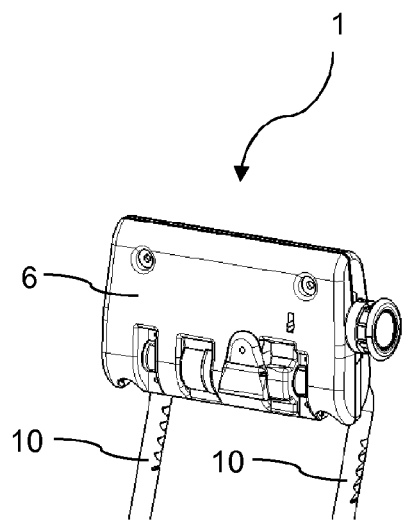
FIGS. 1A to 1D schematically illustrate a head restraint according to the present invention.
Figure 1B:
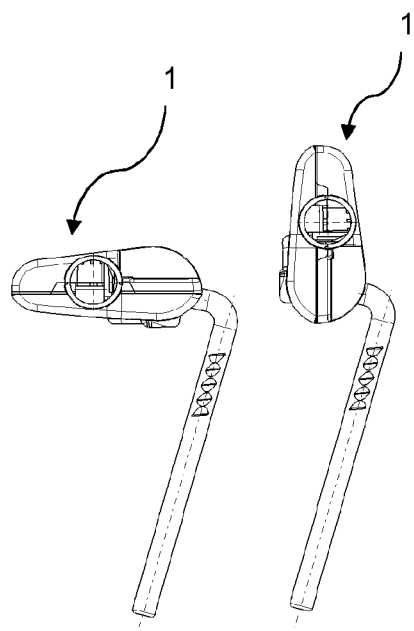

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1C:
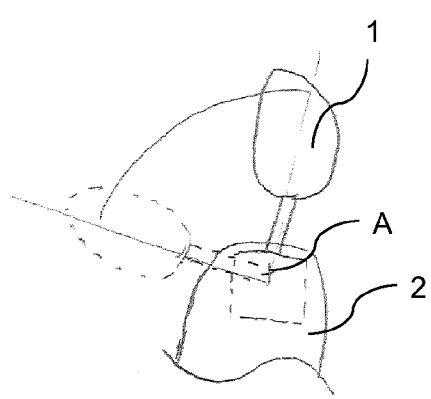
Figure 1D:
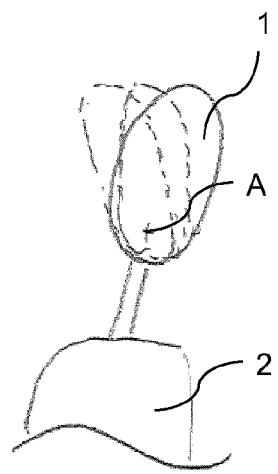
Figure 9:
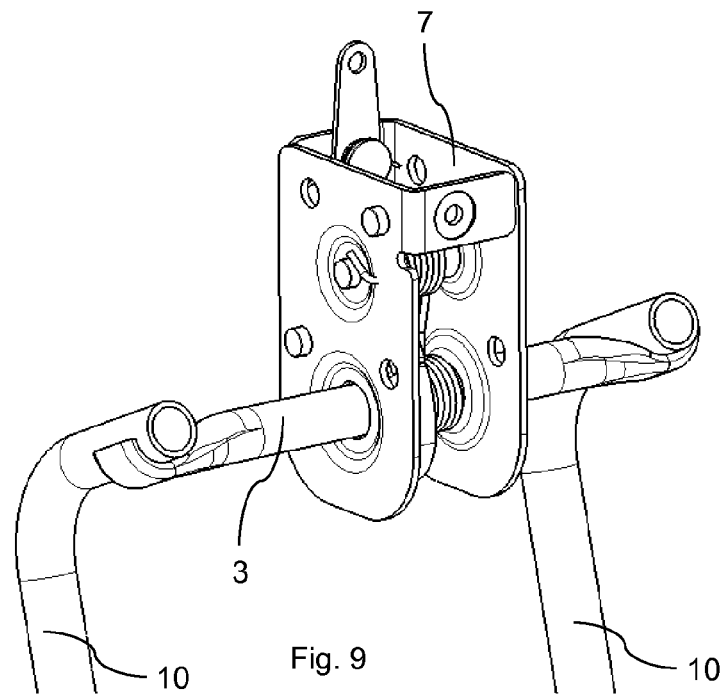
Figure 10:
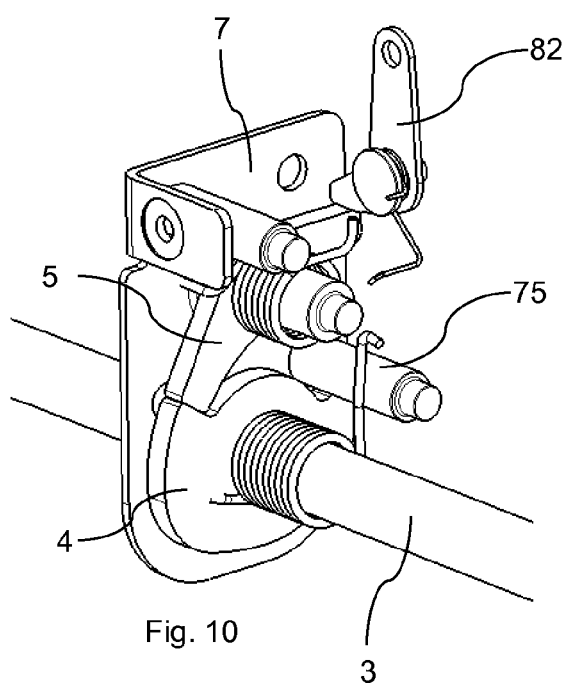
Figure 11:
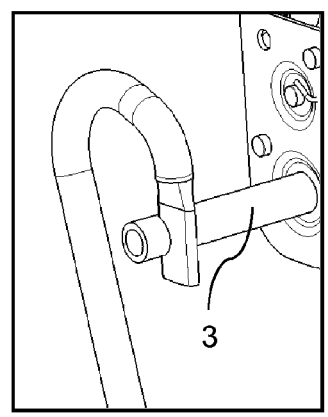

In FIGS. 1A to 1D a head restraint 1 is shown, which is supported by support posts 10. The support posts 10 are mounted to a backrest 2 of a vehicle seat. The head restraint 1 is pivoted about a first pivot axis A. FIG. 1C shows an embodiment of a head restraint, wherein the first pivot axis A is located within the backrest 2, thus the support posts 10 are fixed to the head restraint 1. In contrast to that, FIG. 1D shows an embodiment of a head restraint 1, wherein the first pivot axis A is located within the head restraint 1, thus the support posts 10 are fixed to the backrest 2. FIG. 1A furthermore shows a cover 6 of the head restraint 1.

FIG. 2 shows an embodiment according to the present invention, wherein the cross portion 3 is welded to support posts 10, wherein the support posts 10 comprise a bending of roughly 90 degree. A cover of the head restraint 1 is not shown in FIG. 2 for illustrative purposes. The head restraint 1 comprises housing brackets 7 and a release link 82. In contrast to that FIG. 3 shows an embodiment according to the present invention, wherein the cross portion 3 is welded to support posts 10, wherein the support posts 10 comprise a bending of more than 180 degree. FIG. 2 furthermore shows a pivot bearing surface 71 of the housing brackets 7, bearing the cross portion 3, thus pivoting the housing brackets 7 about the first pivot axis A.

FIG. 4 shows a detailed view of an embodiment according to the present invention, wherein a part of the housing bracket is omitted due to illustrative purposes. The housing brackets 7 accommodate a locking disc 4 and a cam 5. Furthermore the housing brackets 7 accommodate a segment of the cross portion 3. The locking disc 4 is fixed to the cross portion 3. The cross portion 3 defines the first pivot axis A. The cam 5 is pivoted about a second pivot axis B. The release link 82 is pivoted about a further pivot axis, not shown in FIG. 4. Furthermore FIG. 4 shows that the locking plate 4, the cam 5 and the release link 82 are biased by springs (not referenced).

FIG. 5A and FIG. 5B show a perspective view and a side view, respectively, of the housing brackets 7 and components accommodated by the housing brackets 7, wherein the head restraint 1 is in the usage-position and the cam 5 is in the locking-position. A first bearing surface 51, which is a bearing surface of the cam 5, faces a second bearing surface 41, which is a bearing surface of the locking disc 4. Thereby the head restraint 1 is locked in the usage-position. It is possible that the first bearing surface 51 and the second bearing surface 41 do not contact each other in a normal-use situation, such that a clearance exists between them. It can be seen, that release link 82 does not bear against cam 5 in FIG. 5A.

FIG. 5C and FIG. 5D show a perspective view and a side view, respectively, of the housing brackets 7 and components accommodated by the housing brackets 7, wherein the head restraint 1 is in the usage-position and the cam 5 is in the releasing-position. It can be seen that the first bearing surface 51 does not face the second bearing surface 41 anymore. It is shown that a portion of the release link 82 bears against a portion of the cam 5, since release link 82 is pivoted compared to FIGS. 5A and 5B.

FIGS. 6 and 7 show the position of the housing brackets 7, wherein the head restraint 1 acquires the usage position or the storage position, respectively. FIG. 7 furthermore shows that the housing brackets 7 consists of two parts 72 and 73, which are connected by at least one connecting pin 74.

FIGS. 8A to 8C show side views of the housing brackets and the locking disc. FIG. 8A shows the situation, wherein the head restraint acquires the usage-position, FIG. 8B shows the situation, wherein the head restraint acquires a storage-position rotated about 90 degree compared to the usage-position, and FIG. 8C shows the situation, wherein the head restraint acquires a storage-position rotated about 180 degree compared to the usage-position. The locking disc 4 comprises a third bearing surface 42, which faces the first bearing surface 51, when the head restraint 1 acquires the storage-position depicted in FIG. 8B. In FIG. 8B a hooked shaped protrusion 43 of the locking disc 4 is shown, which prevents the first bearing surface 51 from sliding off the third bearing surface 42.

FIGS. 9 to 15 show embodiments of a head restraint according to the third embodiment.

The third embodiment is similar to the first embodiment, with the difference that according to the third embodiment the housing brackets 7 comprise a locking pin 75, wherein the locking pin 75 bears against the second bearing surface 41, when the head restraint acquires the storage-position, as shown in FIG. 15.

Figure 16A:
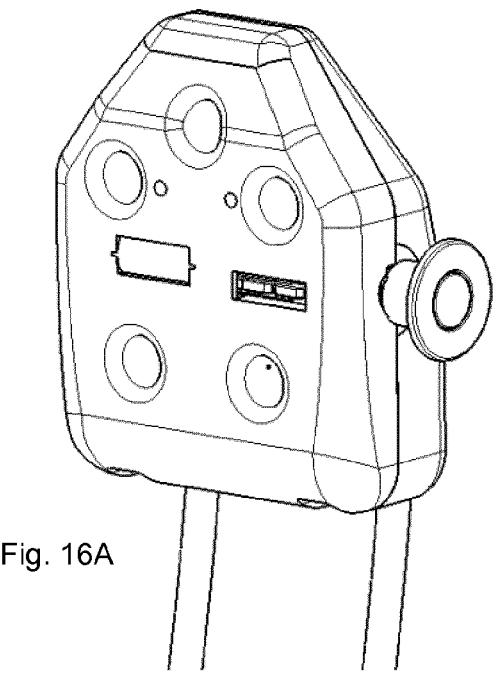
FIGS. 16A to 16Y show embodiments of a head restraint according to the second embodiment.
Figure 16B:
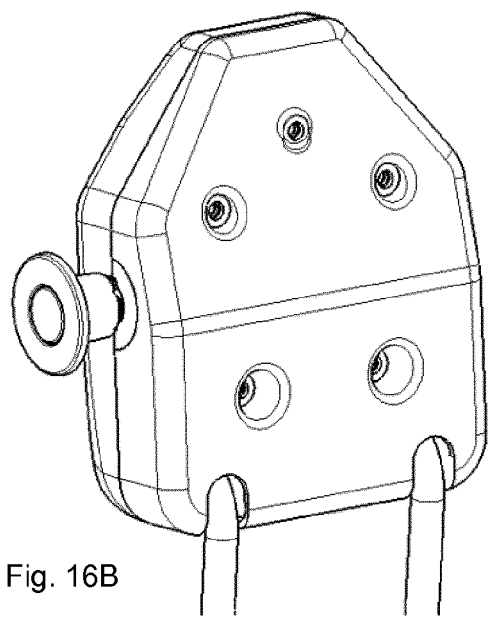
Figure 16C:
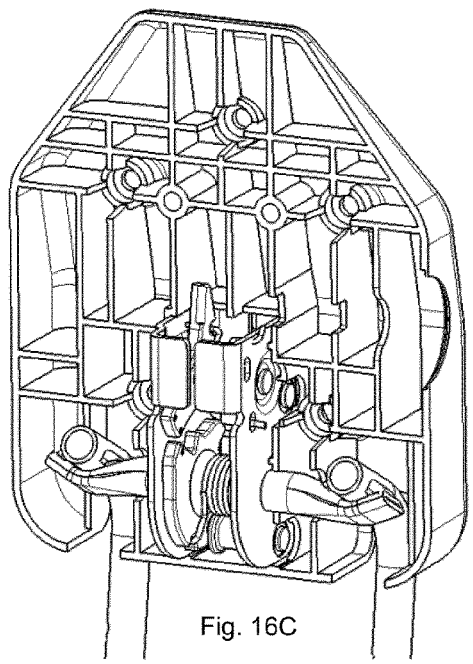
Figure 16D:
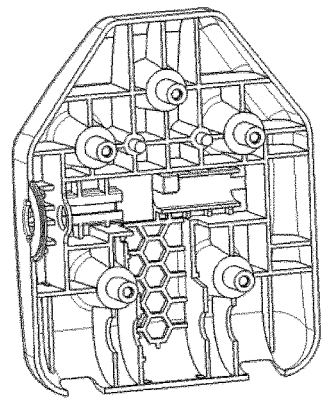
Figure 16E:
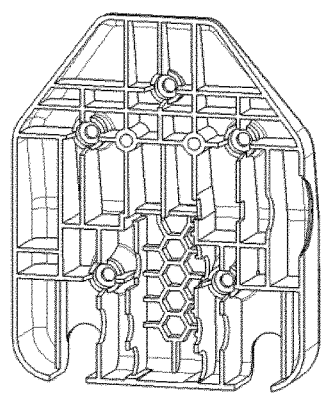
Figure 16F:
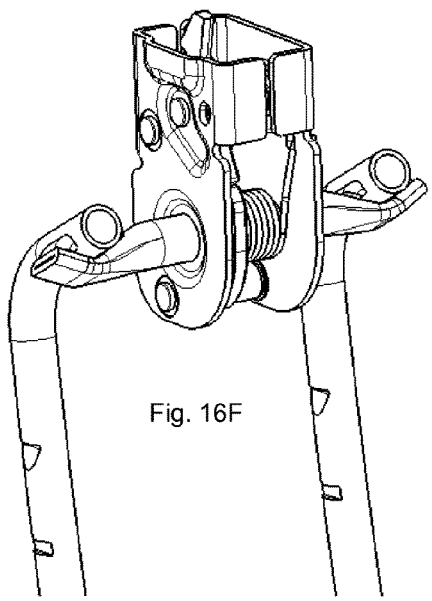
Figure 16G:
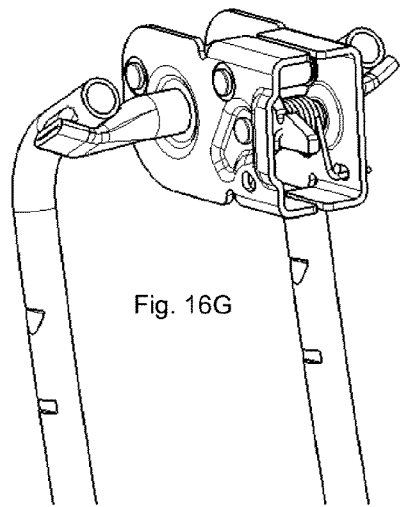
Figure 16H:
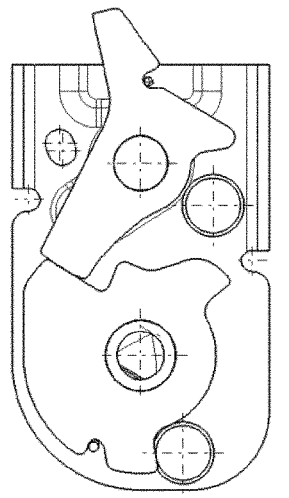
Figure 16I:
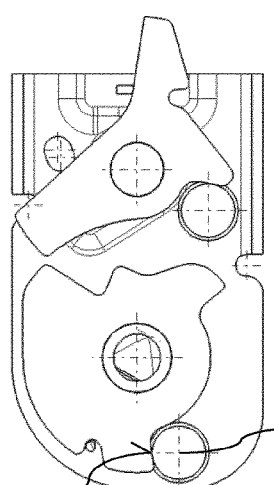
Figure 16J:
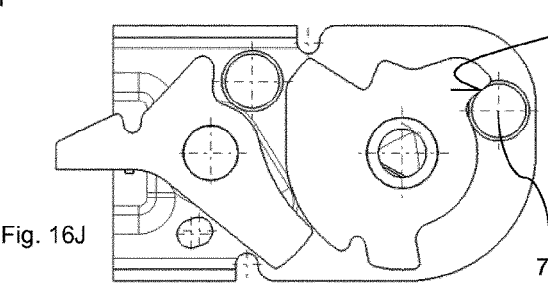
Figure 16K:
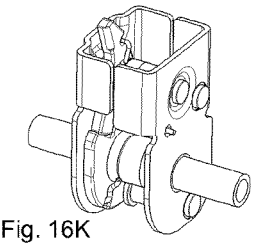
Figure 16L:
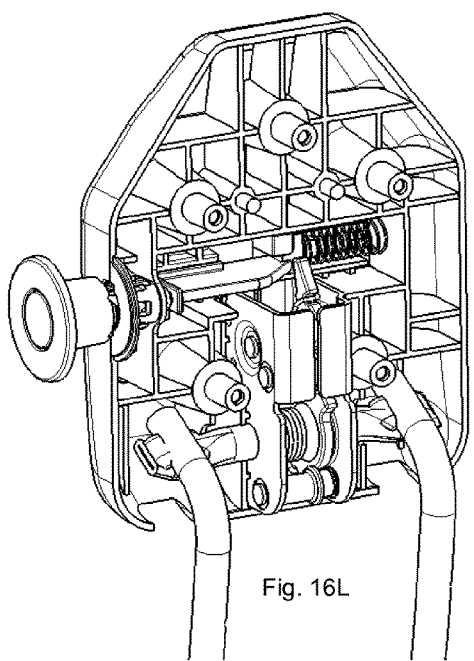
Figure 16M:
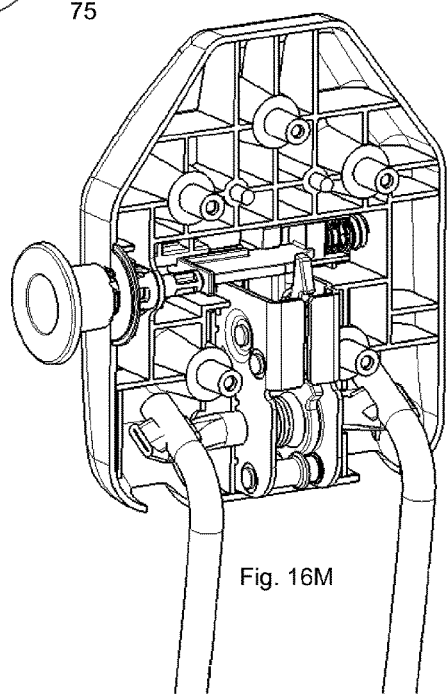
Figure 16O:
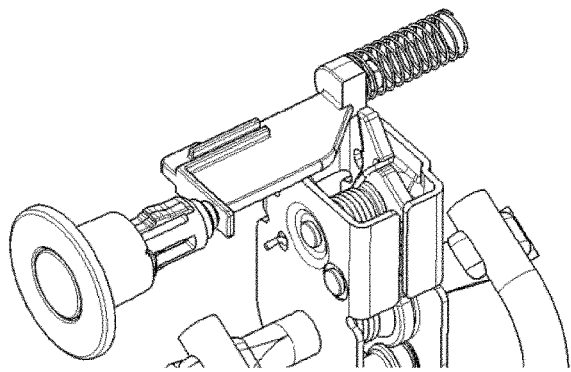
Figure 16N:
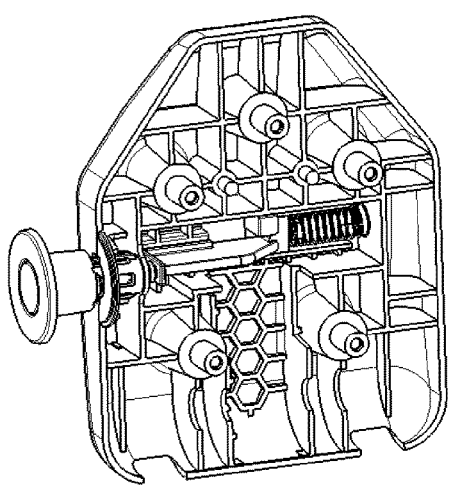
Figure 16Q:
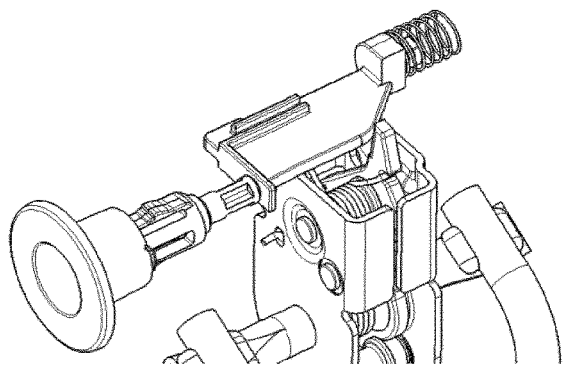
Figure 16P:
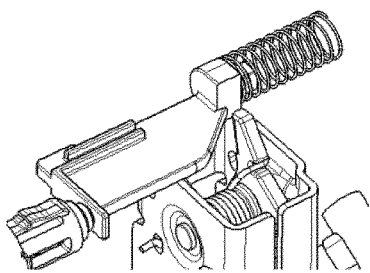
Figure 16R:
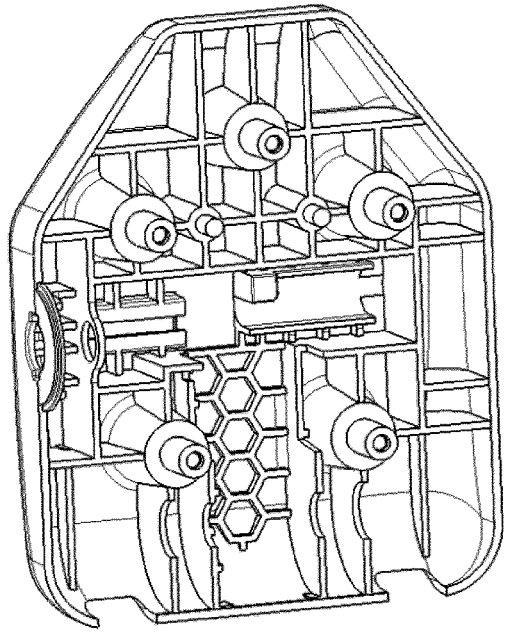
Figure 16S:
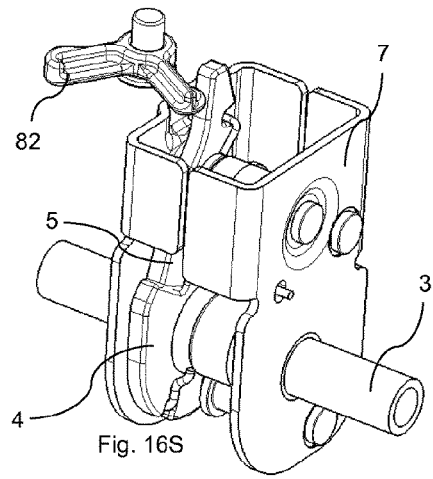
Figure 16T:
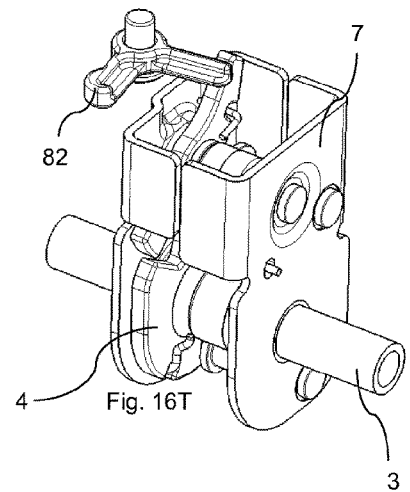

FIGS. 16A to 16T show embodiments of a head restraint according to the second embodiment.

The second embodiment is similar to the first embodiment and the third embodiment with the difference that, when the head restraint 1 is in the storage-position, a locking pin 75 bears against the third bearing surface 42, thereby preventing the head restraint 1 from moving beyond the storage-position, as can be seen from FIG. 16J.

It is possible that the locking disc 4 comprises a fourth bearing surface 44, as depicted in FIG. 16I. When the head restraint 1 acquires the usage-position, the locking pin 75 bears against the fourth bearing surface 44, preventing the head restraint from pivoting beyond the usage-position.

It is preferred, both according to the second embodiment and the third embodiment to use one of the connecting pins 74 as locking pin 75.

FIGS. 16S and 16T show a further embodiment of a release link 82, wherein the second pivot axis B (not shown in FIGS. 16S and 16T) is rotated about 90 degree compared to the embodiment of the release link 82 shown in FIG. 2. FIG. 16S shows the situation, when the cam 5 acquires the locking-position. FIG. 16T shows the situation, when cam 5 acquires the releasing-position.

Figure 16U:
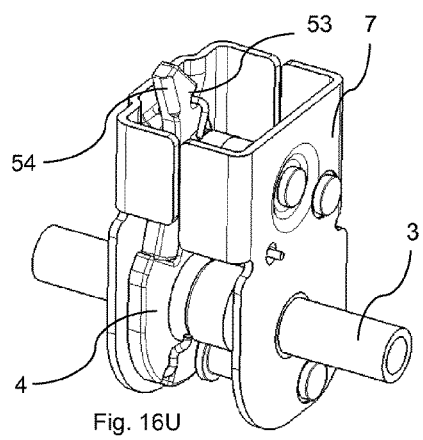

FIG. 16U shows a first arced surface 54 of an arm 53 of the cam 5.

Figure 16V:
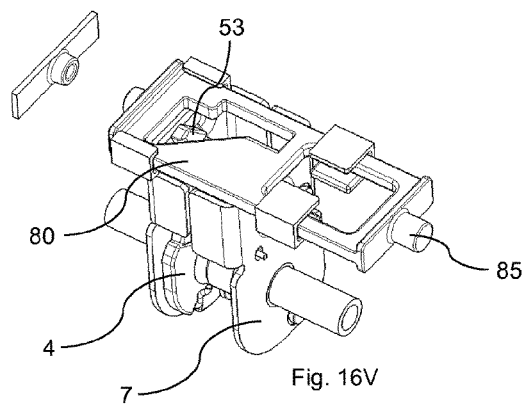

FIG. 16V shows the housing brackets 7 and a wedge release 80. The wedge release 80 contacts the arm 53. A button post 85 is connected to the wedge release 80.

FIG. 16W shows that the arm 53 of the cam 5 comprises the first arced surface 54 and the wedge release 80 comprises a second arced surface 87. Furthermore a blocking-surface 86 of the wedge release 80 is shown. In FIGS. 16V and 16W the wedge release acquires a further locking-position. The cam 5 acquires the locking-position and is prevented from moving to the releasing-position by the blocking-surface 86.

In contrast to that FIG. 16X shows the wedge release acquiring a further releasing-position. During the movement of the wedge release from the further locking-position to the further releasing-position, the cam 5 is forced to move from the locking-position to the releasing-position by a force transmitted by the second arced surface 87.

FIG. 16Y depicts guides 63 of the cover 6 of the head restraint 1, which are configured to retain the wedge release 80.

FIGS. 52A to 52E show a head restraint 1 according to a variation of the third embodiment. Deviating from the third embodiment, a sleeve 500, in particular a rubber sleeve, is arranged on the locking pin 75. The sleeve 500 reduces looseness of the locking disc 4 when the head restraint is in the usage-position and the cam 5 is in the locking-position, see FIG. 52C. Furthermore, potential movement of the locking disc 4 is attenuated when the head restraint 1 is in the storage-position.

The head restraint 1 is biased by a spring 100 in the direction of the storage-position. The spring 100 is accommodated in the housing brackets 7. Alternatively, the spring 100 may be arranged outside the housing brackets 7.

Figure 17A:
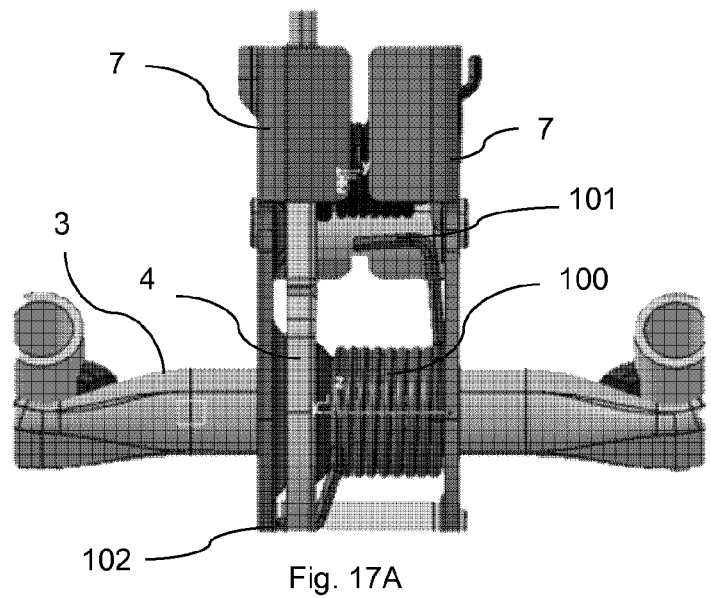
FIGS. 17A and 17B show a fourth embodiment of a head restraint according to the present invention.
Figure 17B:
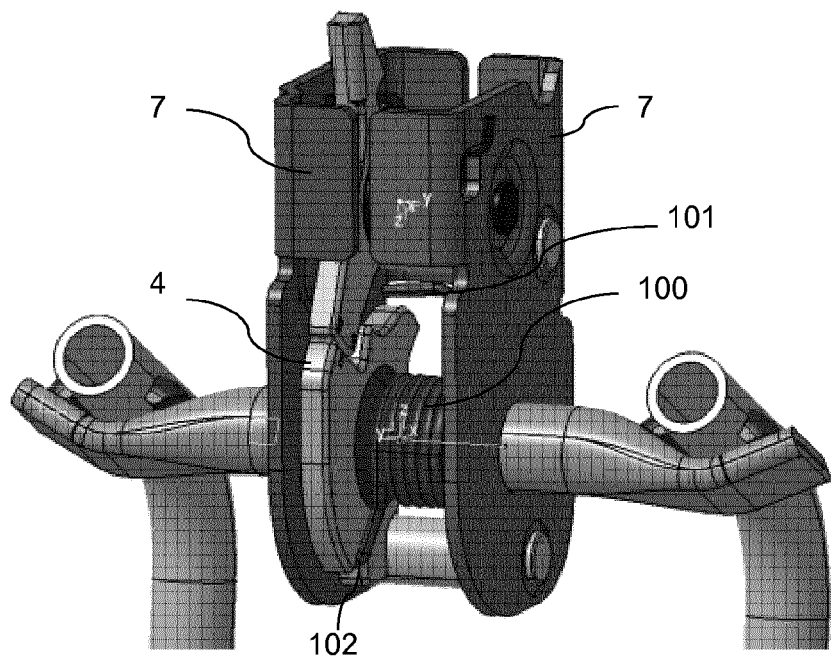

FIGS. 17A and 17B show a head restraint 1 according to the fourth embodiment. The fourth embodiment is similar to the second embodiment with the difference that the head restraint 1 is biased by a spring 100, wherein the spring 100 is directly connected to the front cover (not shown) of the head restraint. The spring 100 has a first leg 101 which contacts the front cover of the head restraint. Further, the spring 100 has a second leg 102 that hooks into the locking disc 4. The spring 100 is wound around the cross portion 3 and is accommodated in the housing brackets 7.

Figure 18A:
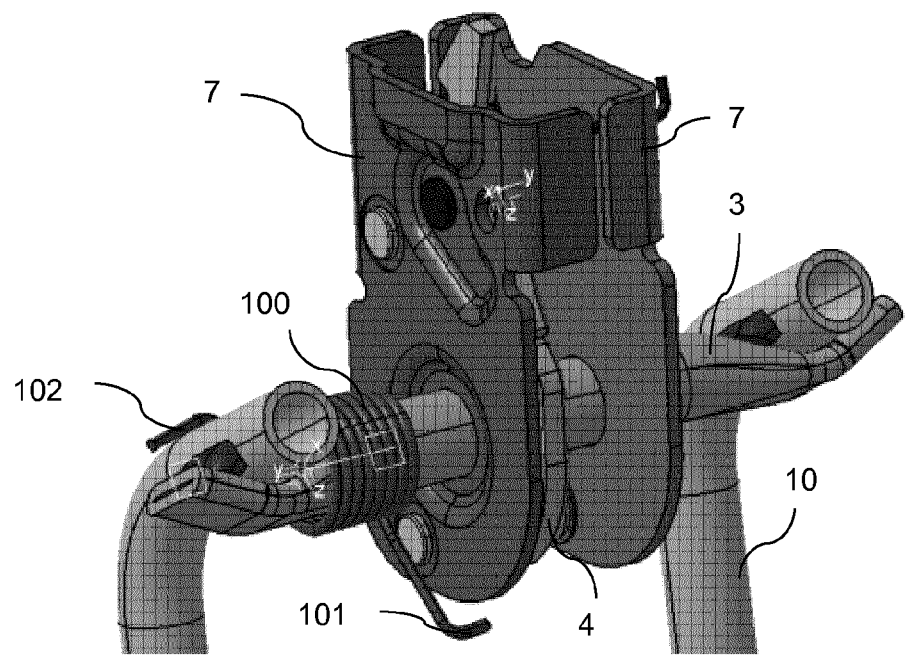
FIGS. 18A and 18B show a fifth embodiment of a head restraint according to the present invention.
Figure 18B:
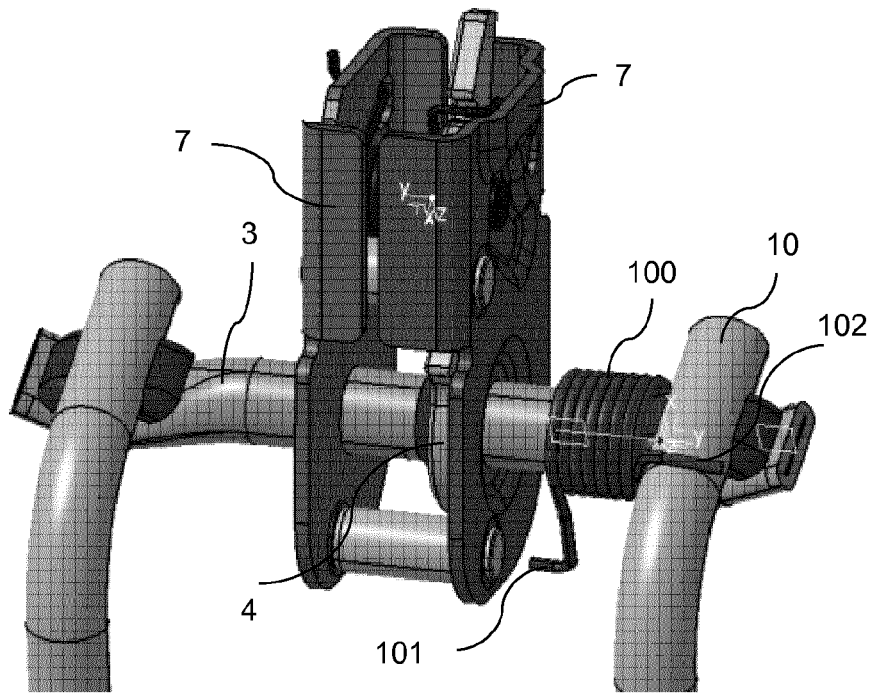

FIGS. 18A and 18B show a head restraint 1 according to the fifth embodiment. According to this embodiment the head restraint 1 is biased by a spring 100, wherein the spring 100 is directly connected to the front cover (not shown) of the head restraint. The spring 100 is wound around the cross portion 3 and is arranged outside the space confined by the housing brackets 7. Thus, a housing bracket 7 is arranged between the spring 100 and the locking disc 4. The spring 100 is directly connected to one of the support posts 10 and directly connected to a front cover (not shown) of the head restraint 1. A first leg 101 of the spring 100 connects to the front cover and a second leg 102 hooks to the support post 10.

A head restraint 1 according to a variation of the fifth embodiment is depicted in FIGS. 53A to 53C. The head restraint 1 is biased by a spring 100, wherein the spring 100 is directly connected to the front cover 6 of the head restraint. The spring 100 is wound around the cross portion 3 and is arranged outside the space confined by the housing brackets 7. Thus, a housing bracket 7 is arranged between the spring 100 and the locking disc 4. The spring 100 is directly connected to one of the support posts 10 and directly connected to a feature of the front cover 6 of the head restraint 1. A first leg 101 of the spring 100 connects to the feature of the front cover 6 and a second leg 102 hooks to the support post 10.

Furthermore, a button post 603 of a push button 602 is connected to the wedge release 80. The wedge release is additionally connected to a cable 600. The cable 600 is guided in a cable conduit 601. The cable conduit 601 attaches to the front cover 6 and is routed through one of the support posts 10. Thus, the wedge release 80 can be moved from the further locking-position to the further unlocking-position either by pushing the push button 602 or by pulling the cable 600.

Figure 21A:
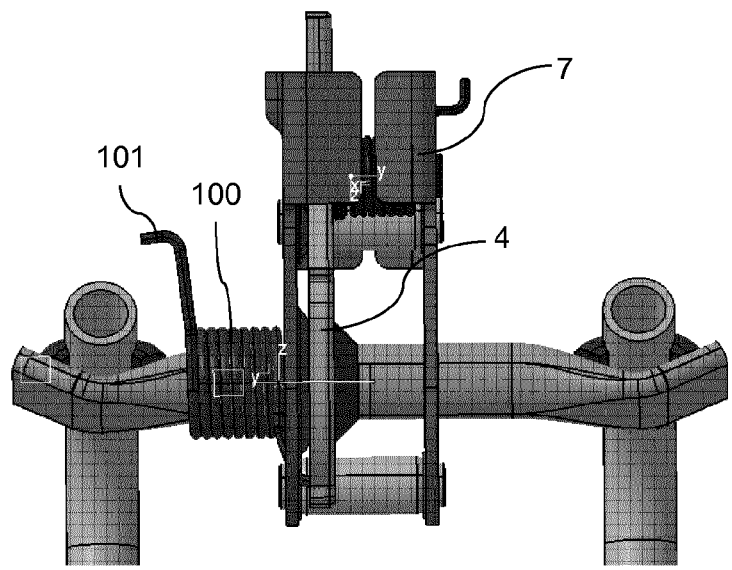
FIGS. 21A and 21B show an eighth embodiment of a head restraint according to the present invention.
Figure 21B:
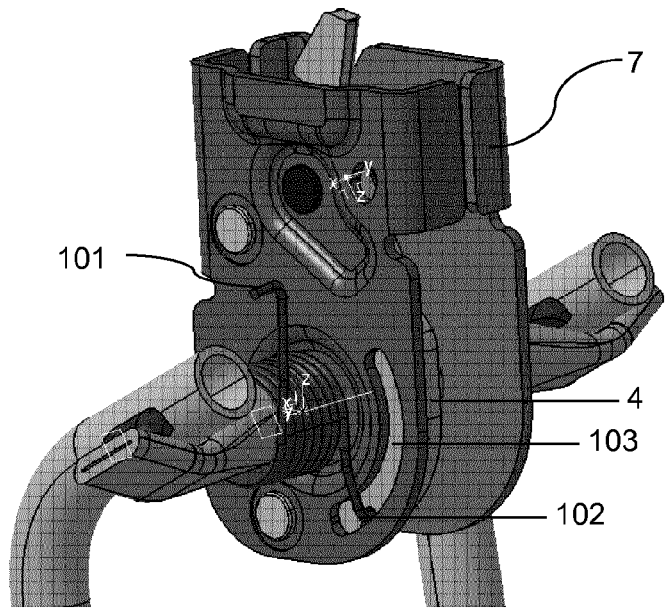

FIGS. 21A and 21B show a head restraint 1 according to the eighth embodiment. Similar to the fifth embodiment the head restraint 1 according to the eighth embodiment is biased by a spring 100, wherein the spring 100 is directly connected to the front cover (not shown) of the head restraint 1. The spring 100 is wound around the cross portion 3 and is arranged outside the space confined by the housing brackets 7. One of the housing brackets 7 is arranged between the spring 100 and the locking disc 4. The spring 100 is directly connected to the locking disc 4 which is arranged between the housing brackets 7. An opening 103 is provided in the housing bracket 7 placed between the spring 100 and the locking disc 4. A first leg 101 of the spring 100 connects to the front cover and a second leg 102 extends through the opening 103 in the housing bracket 7 and hooks to the locking disk 4.

Figure 19A:
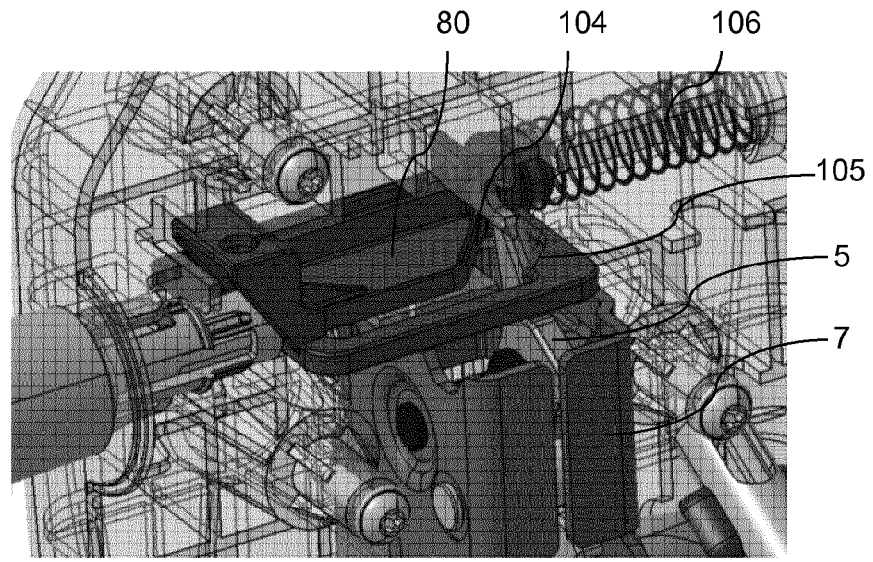
FIGS. 19A and 19B show a sixth embodiment of a head restraint according to the present invention.
Figure 19B:
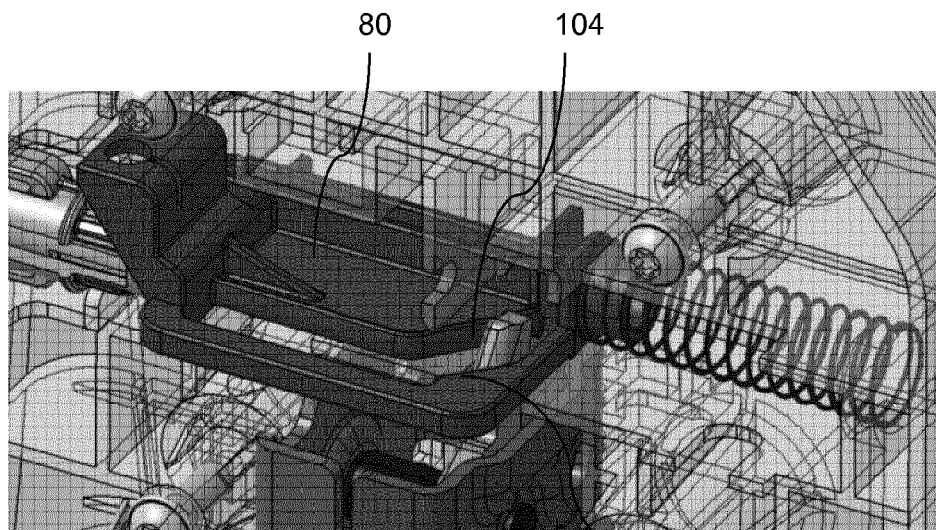

FIGS. 19A and 19B show a head restraint 1 according to the sixth embodiment. The head restraint 1 comprises a wedge release 80. The wedge release 80 comprises a first wedge 104 that is configured to move the cam 5 from the locking-position to the releasing-position by moving the wedge release 80 from the further locking-position to the further releasing-position. The sixth embodiment is similar to the second embodiment with the difference that the wedge release 80 has a second wedge 105 that is configured to move the cam 5 from the releasing-position to the locking-position by moving the wedge release 80 from the further releasing-position to the further locking-position. A wedge spring 106 forces the wedge release 80 into the further locking-position thereby pushing the cam 5 into the locked-position.

Figure 20A:
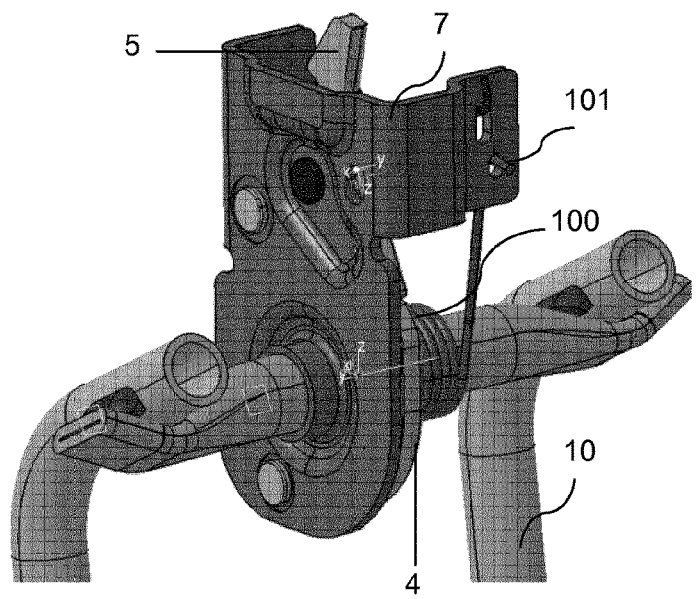
FIGS. 20A to 20C show a seventh embodiment of a head restraint according to the present invention.
Figure 20C:
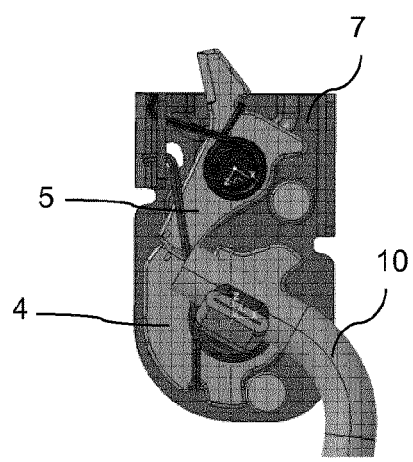
Figure 20B:
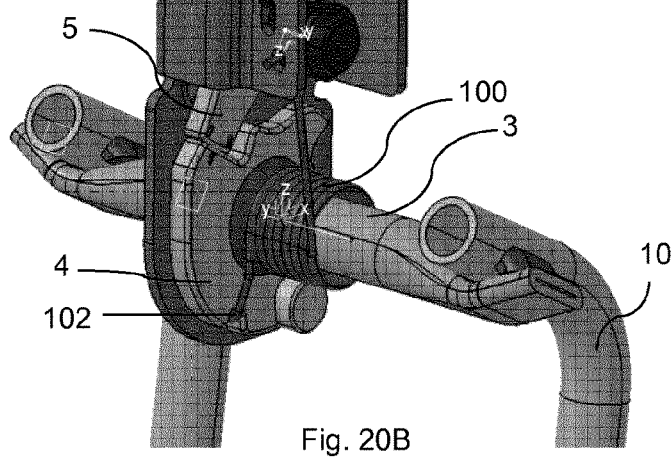

FIGS. 20A to 20C show a head restraint 1 according to the seventh embodiment. According to this embodiment the head restraint comprises a single housing bracket 7 that at least partially accommodates the locking disc 4 and the cam 5. The single housing bracket 7 holds the cam 5 and provides openings to connect the first leg 101 of spring 100 which biases the head restraint 1. The second leg 102 of the spring 100 hooks into the locking disc 4.

Though it is preferred that the embodiments presented above are alternative embodiments, under certain circumstances it might be useful to combine those embodiments.

In the following further embodiments of the present invention are described.

Figure 22:
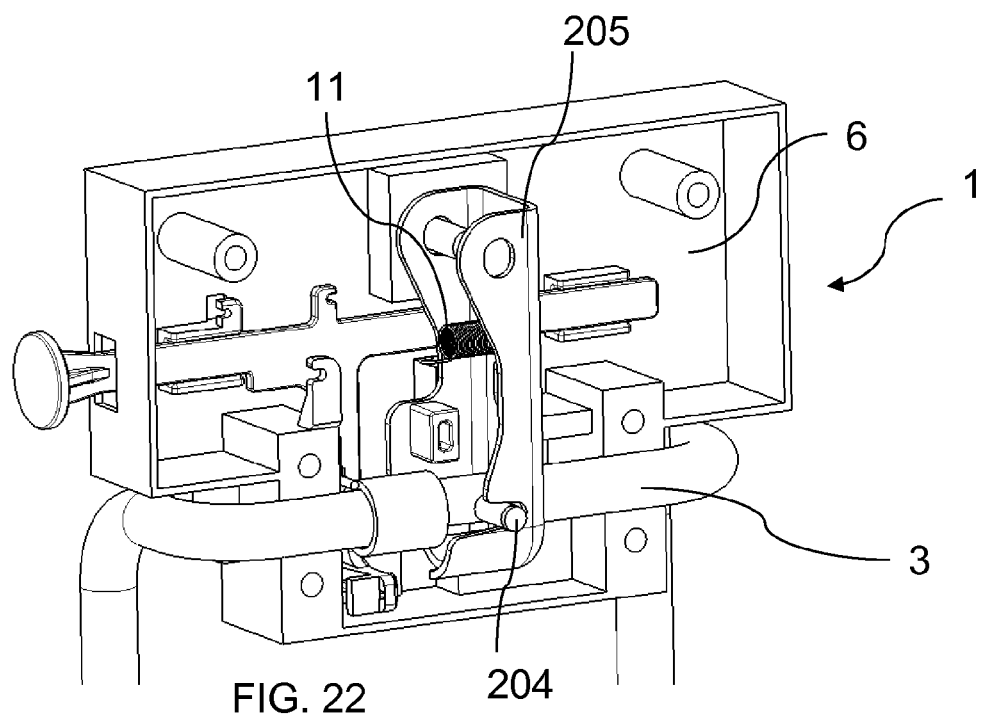
FIG. 22 shows a perspective view of a head restraint according to a ninth embodiment of the present invention, wherein a part of the cover is omitted for illustrative purposes.

In FIGS. 22 and 23 the inner components of the head restraint 1 according to the ninth embodiment are shown. The head restraint 1 comprises a cover 6, wherein a part of the cover is not shown in FIG. 22. Furthermore FIG. 22 shows a cross portion 3. The cross portion defines the first pivot axis A. The cross portion comprises a locking pin 204, and the head restraint comprises a latch 205, which is able to bear against the locking pin 204. The latch 205 is pivoted about a second pivot axis (not referenced in FIG. 22) by a bolt and biased by a lock spring 11 in the direction of the locking-position. According to this ninth embodiment the latch 205 has the form of a bracket. Furthermore FIG. 23 shows a push button 270, that can be pressed. When pressed, the push button 270 and a push button link 271 fixed to the push button 270 move rightward and the push button link 271 bears against the latch 205, so that the latch 205 moves from the locking-position to the releasing-position.

In FIG. 24 it can be seen that the locking pin extrudes from the cross portion at two opposing sides of the cross portion. Alternatively it is possible to provide two separate locking pins protruding at two opposing sides of the cross portion.

FIG. 25 illustrates the geometric properties of the ninth embodiment of the latch 205 depicted in FIG. 22. The latch 205 comprises a notch 252 which has two bearing surfaces 251 bearing against the locking pin 204. It can be seen from FIG. 25 that the bearing surfaces 251 of the notch 252 are inclined one related to the other.

FIG. 26A illustrates the bearing holes of the latch 205 which are able to bear a bolt, thereby defining the second pivot axis B. It can be seen from FIG. 26A that the bearing holes are elongated, thus providing clearance to the bold. Thereby the pivot axis B is movable.

FIG. 26B shows a cross section according to plane A-A of FIG. 26A, such that it can be seen, that in this embodiment a single locking pin 204 protrudes on two opposing sides of the cross portion 3.

FIG. 27A shows the latch 5 in the locking-position and FIG. 27B shows the latch 205 in the releasing-position. It can be seen that the latch 205 bears against the locking pin 204 in the locking-position and releases the locking pin 204 in the releasing-position, thus allowing the latch 205, and thereby the whole head restraint 1, to pivot about the first pivot axis A. As can be seen in FIG. 27B, the latch 205 comprises a push point 207 and a pull point 8. The latch is moved from the locking-position to the releasing-position by applying a compression force to the push point 207 and/or a pulling force to the pull point 8.

FIG. 28 shows the latch 205 when the head restraint acquires the storage-position. The locking pin 204 bears against a further bearing surface 253 of the latch 205, such that the latch 205 cannot return to the locking-position, despite the fact that latch 205 is biased by lock spring 11 in the direction of the locking-position.

In FIG. 29 one of two contact stops 9 are visible, contacted by the locking pin 204 when the head restraint acquires the storage-position.

Figure 31:
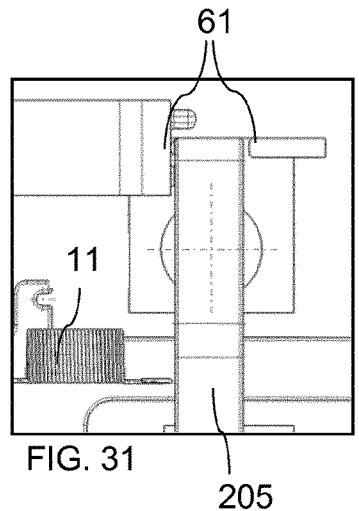
FIG. 31 shows a detail of a front view of the embodiment shown in FIG. 30.

FIGS. 30 to 42 show a tenth embodiment of the latch 205. In this tenth embodiment the latch 205 is an overmolded part. As can be seen in FIG. 31, in this embodiment the latch 205 is not pivoted by a bold, but placed between parts of a pivot contact feature 61. In FIG. 31 the latch 205 is biased against the left part of the pivot contact feature 61. By bearing of the latch 205 against the pivot contact features 61 the second pivot axis B (not explicitly shown in FIG. 31) is defined. The distance of the parts of the pivot contact feature 61 is wide enough to provide clearance for the latch 205, such that the latch 205, and thereby the second pivot axis B, can be moved.

Figure 32:
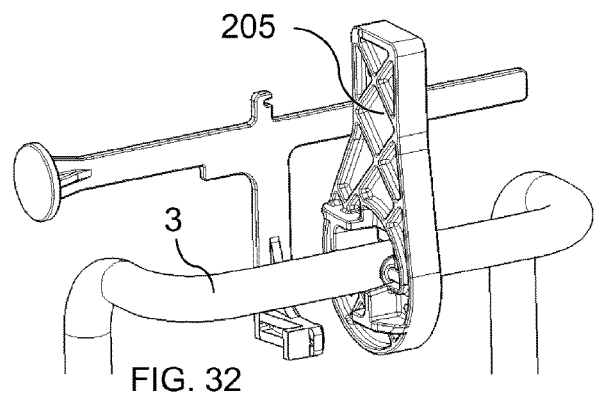
FIG. 32 shows a perspective view similar to FIG. 23, illustrating the embodiment shown in FIG. 30.

FIG. 32 depicts the arrangement of the latch 205 relative to the cross portion 3 and an actuation means (not referenced).

Figure 33A:
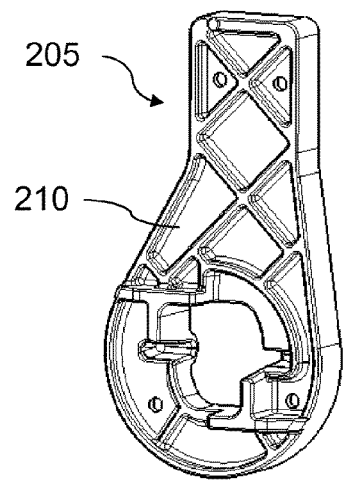
FIGS. 33A to 33C show perspective views of the embodiment of the latch shown in FIG. 30 and members thereof.
Figure 33B:
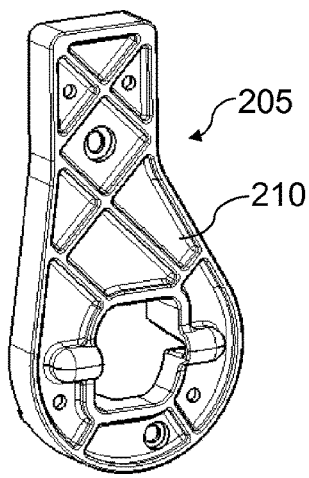
Figure 33C:
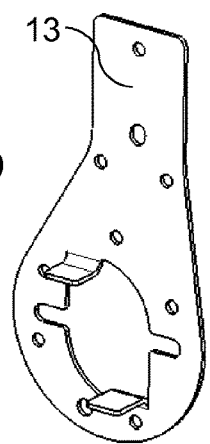

FIGS. 33A to 33C show the latch 205 of the tenth embodiment. The latch 205 is an overmolded part comprising a steel plate 13 and an overmolding material 210. The steel plate 13 reinforces the latch in the form of an overmolded part.

Figure 34:
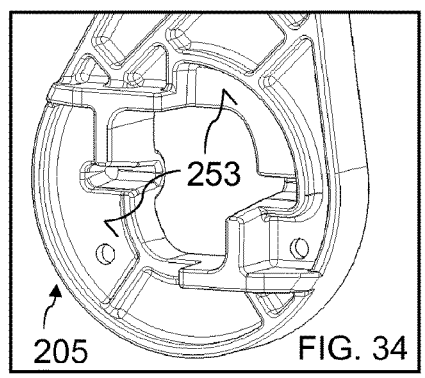
FIG. 34 shows a detail of FIG. 33A.

Like the ninth embodiment of the latch 205 the tenth embodiment of the latch 205 comprises further bearing surfaces 253, as shown in FIG. 34, such that the locking pin 204 bears against the further bearing surfaces 253 of the latch 205, when the head restraint is in the storage-position, thus preventing the latch 205 from returning to the locking-position, despite the fact that the latch 205 is biased in the direction of the locking-position by the lock spring 11.

Figure 35:
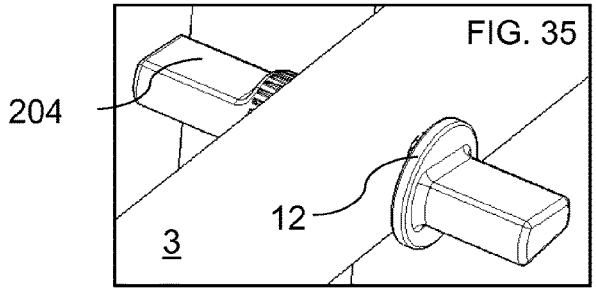
FIG. 35 shows a detail of the embodiment illustrated in FIG. 30, wherein the latch is omitted for illustrative purposes.
Figure 39:
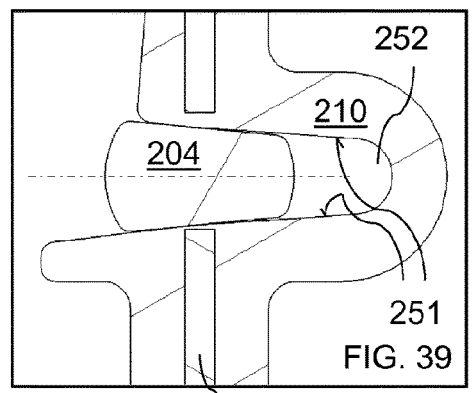
FIG. 39 shows a cross-section of the plane B-B of FIG. 36.

In the tenth embodiment, the locking pin 204 is tapered, as can be seen in FIG. 35. Thereby, the area of the contact surface to the latch 205 is increased since the latch 205 has bearing surfaces 251 which are inclined one related to the other, as shown in FIG. 39.

Figure 36:
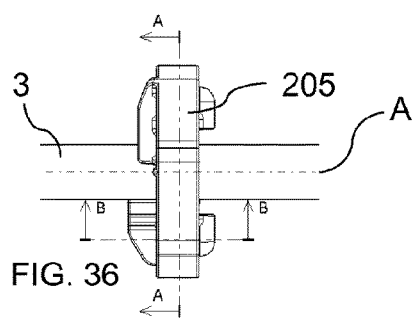
FIG. 36 shows a detail of a top view of the tenth embodiment, defining a further plane A-A and a plane B-B.

FIG. 36 shows a detail of a top view of the second embodiment, defining a further plane A-A and a plane B-B.

Figure 37:
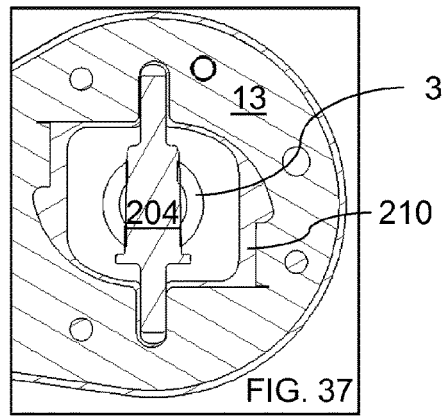
FIG. 37 shows a cross-section of the further plane A-A of FIG. 36.

FIG. 37 shows a cross-section of the further plane A-A of FIG. 36.

Figure 38:
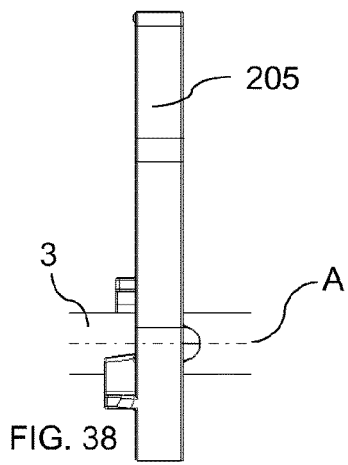
FIG. 38 shows a detail of a front view of the embodiment illustrated in FIG. 30.

FIG. 38 shows a detail of a front view of the embodiment illustrated in FIG. 30.

Figure 40A:
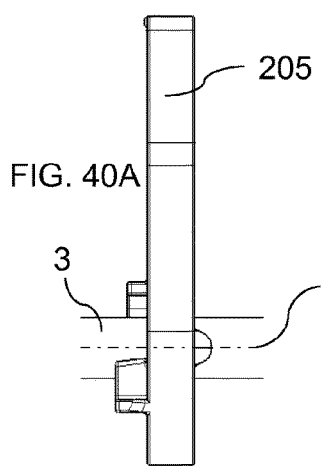
FIGS. 40A and 40B show the latch of the embodiment illustrated in FIG. 30 in the locking-position and in the releasing-position, respectively.
Figure 40B:
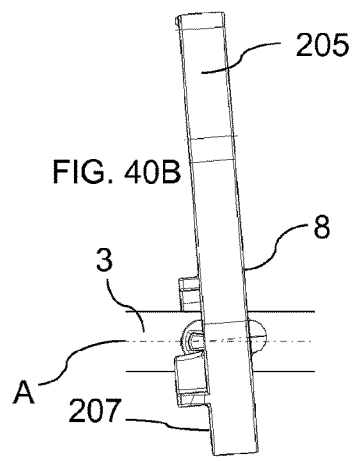

FIGS. 40A and 40B show the latch 205 according to the tenth embodiment in the locking-position (FIG. 40A) and in the releasing-position (FIG. 40B). As depicted in FIG. 40B the latch 205 according to the second embodiment comprises a push point 207 and a pull point 8, similar to the latch 205 according to the ninth embodiment, as illustrated in FIG. 27B.

Figure 41:
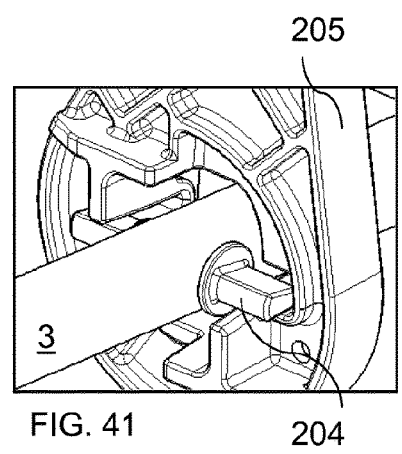
FIG. 41 shows a detail of the embodiment illustrated in FIG. 30, the latch acquiring the releasing-position.

FIG. 41 shows a detail of the embodiment illustrated in FIG. 30, the latch acquiring the releasing-position.

Figure 42:
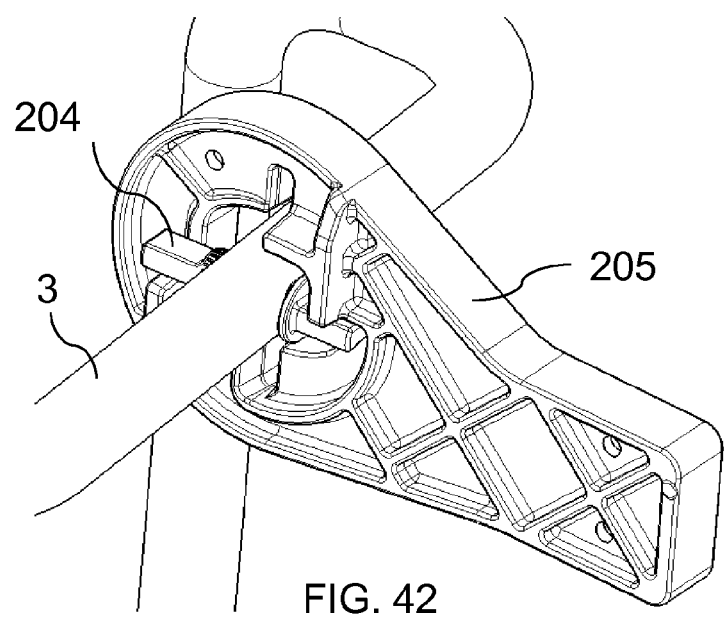
FIG. 42 shows a detail of the embodiment illustrated in FIG. 30, the head restraint acquiring the storage-position, wherein members of the head restraint are omitted for illustrative purposes.

FIG. 42 shows a detail of the embodiment illustrated in FIG. 30, the head restraint acquiring the storage-position, wherein members of the head restraint are omitted for illustrative purposes.

Figure 43:
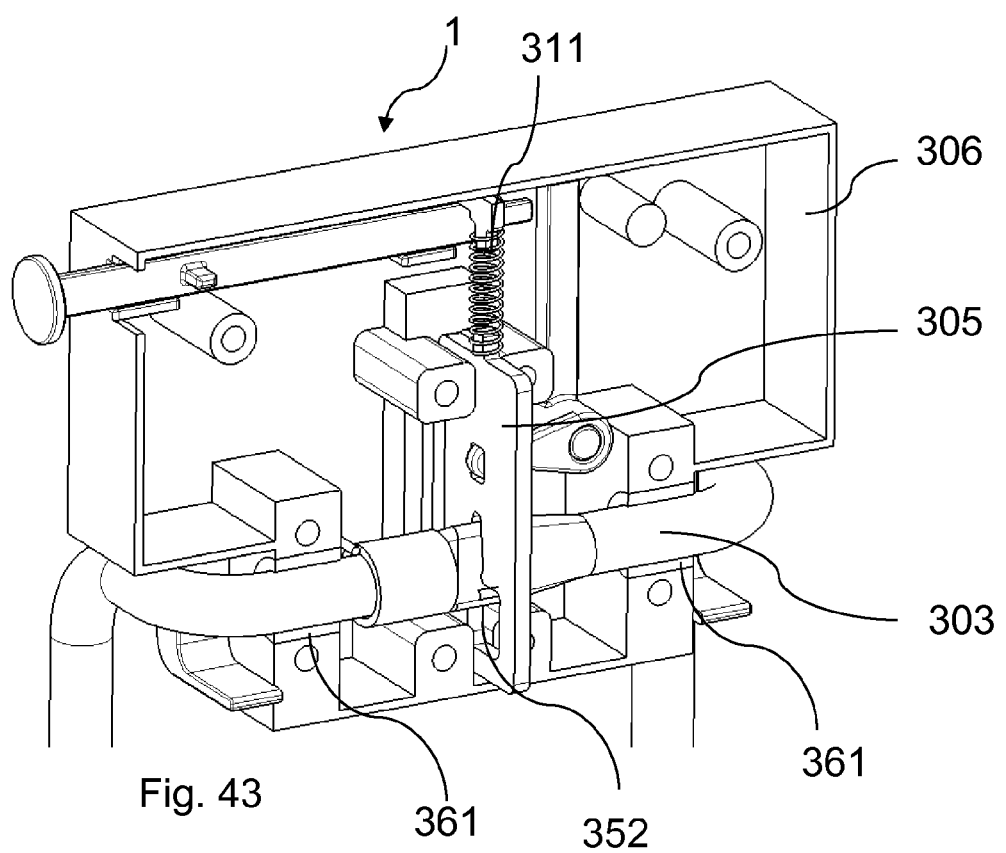
FIG. 43 shows a perspective view of a head restraint according to the present invention, wherein a part of the cover is omitted for illustrative purposes.

FIG. 43 shows the inner components of a head restraint 1 according to the present invention. A lock plate 305 of the head restraint 1 is positioned relative to a cross tube 303 in a way, that the cross tube 303 extents through a recess 352 of the lock plate 305. The head restraint 1 furthermore comprises a cover 6, which accommodates at least the lock plate 305 and at least essentially the cross tube 303. The cover comprises pivot axis bearing surfaces 361 bearing against portions of the cross tube 303, thus defining the pivot axis A. The lock plate 305 is biased by a spring 311 in the direction of the locking-position. Alternatively the lock plate 305 might be biased by the spring 311 in the direction of the releasing-position.

Figure 44:
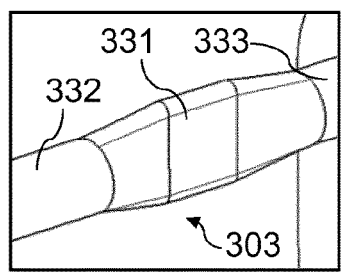
FIG. 44 shows a detail of the head restraint depicted in FIG. 43, wherein further components are omitted for illustrative purposes.

FIG. 44 shows that the cross tube 303 is divided into three segments, i.e. the flattened segment 331, the second segment 332 and the third segment 333. The second segment 332 and the third segment 333 have rotational symmetry, so that the pivot axis bearing surfaces 361 can pivot the head restraint 1 about the pivot axis A defined by the second segment 332 and the third segment 333.

Figure 45:
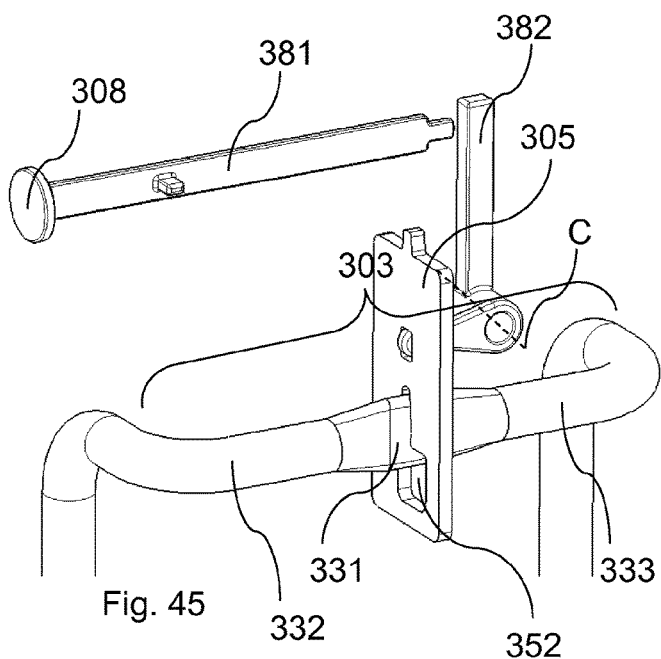
FIG. 45 shows the head restraint depicted in FIG. 43, wherein further components are omitted for illustrative purposes.

FIG. 45 shows the inner components of the head restraint 1, wherein with respect to FIG. 43 further components are omitted for illustrative purposes. It can be seen that the cross tube 303 is divided into the flattened segment 331, the second segment 332 and the third segment 333, wherein the flattened segment 331 is located in the recess 352 of the lock plate 305 and contacts the lock plate 305. A push button 308 is provided that can be pressed. When pressed, the push button 308 moves a bush button link 381 rightwards which applies a release link 382 which pivots clockwise and moves the locking plate 305 upwards, i.e. in FIG. 45—without limiting the scope of the invention—from the locking-position to the releasing-position.

Figure 46A:
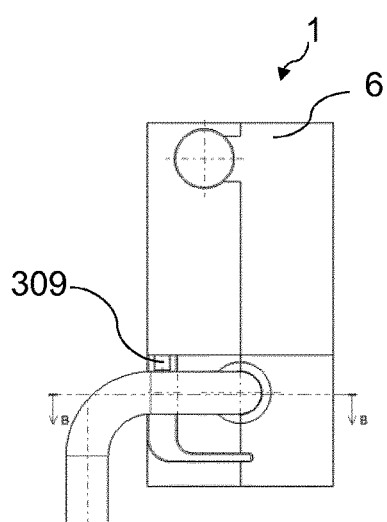
FIG. 46A shows a side view of the head restraint, defining a plane B-B.

FIG. 46A shows a side view of the head restraint 1. Freeplay of the head restraint 1 is reduced by rubber bumpers 300, also shown in FIG. 47A.

Figure 46B:
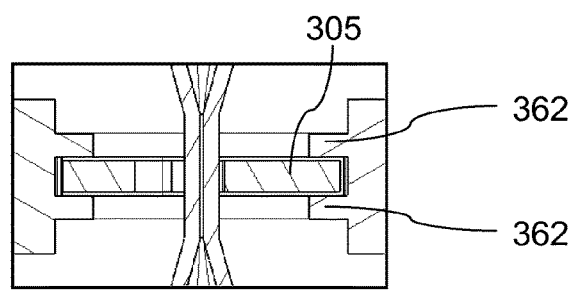
FIG. 46B shows a cross section of the plane B-B defined in FIG. 5A.

In FIG. 46B a cross section according to the plane B-B defined in FIG. 46B is depicted. It can be seen, that the extension of the cross tube in one direction is reduced in the flattened section 331 compared to the extension of the cross tube in the second section 332 and the third section 333.

Figure 47A:
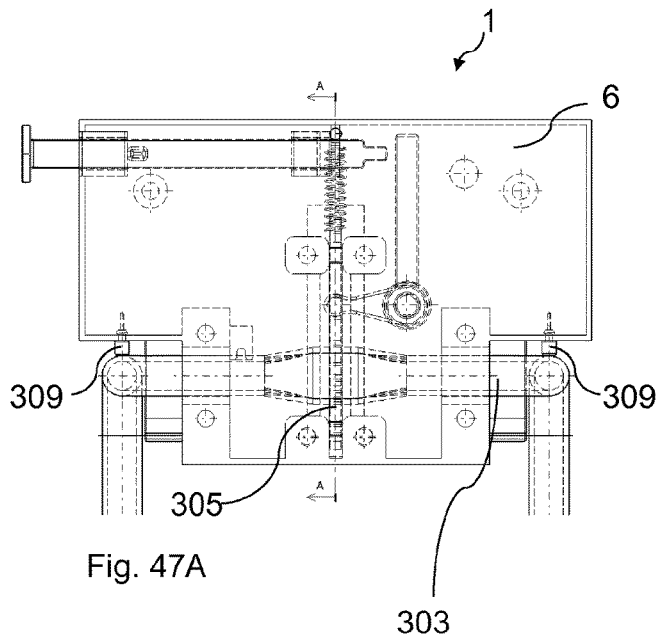
FIG. 47A shows a front view of the head restraint, defining a plane A-A.

FIG. 47A shows a front view of the head restraint, defining a plane A-A.

Figure 47B:
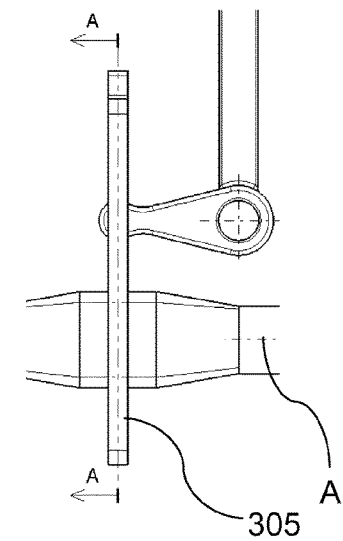
FIG. 47B shows a detail of the head restraint depicted in FIG. 47A, wherein the cover is omitted for illustrative purposes.

FIG. 47B shows a detail of the head restraint depicted if FIG. 47A, wherein the cover is omitted for illustrative purposes.

Figure 47C:
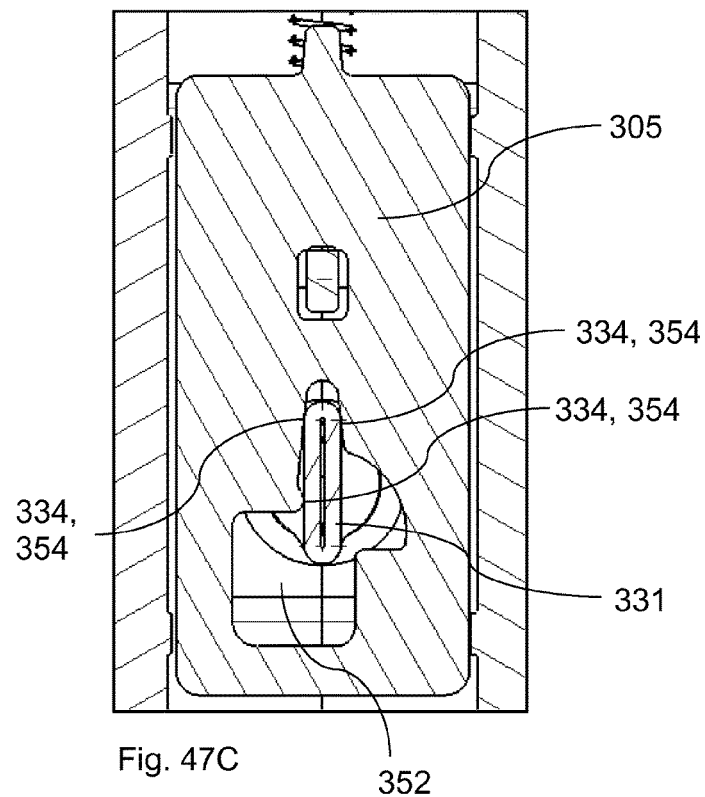
FIG. 47C shows a cross section of the plane A-A defined in FIG. 47A.

FIG. 47C shows that, when the head restraint acquires the usage-position and the lock plate acquires the locking-position, three second bearing surfaces 334, being bearing surfaces of the flattened segment 331 of the cross tube 303, are in contact with three first bearing surfaces 354, being bearing surfaces of the lock plate 305.

FIG. 48A shows the lock plate 305 in the locking-position and the flattened segment 331, wherein the head restraint 1 acquires the usage-position. FIG. 488 shows the lock plate 305 in the releasing-position, while the head restraint 1 remains in the usage-position. The lock plate 305 gets from the locking-position to the releasing-position by a translational movement in the sliding direction 307. FIG. 48C shows the lock plate 305 in the releasing-position when the head restraint 1 acquires the storage-position. The lock plate 305 is prevented from returning to the locking-position by a fifth bearing surface 356 of the lock plate which bears against the flattened segment 331. Furthermore two third bearing surfaces 355, being bearing surfaces of the lock plate 305, contact two third bearing surfaces 335, being bearing surfaces of the flattened segment 331.

FIGS. 49A and 49B schematically illustrate a head restraint 1. The head restraint 1 is supported by support posts 10. The head restraint 1 shown in FIGS. 49A and 49B is pivoted about an axis. Thus the head restraint 1 can acquire a storage-position, as shown in the left part of FIG. 49B, and a usage-position, as shown in the right part of FIG. 49B. The head restraint shown in FIGS. 49A and 49B comprises a push button release 409. A head restraint 1 according to the present invention might comprise a push button release, but it is not necessary that a head restraint according to the present invention comprises a push button release and it is preferred according to the present invention that a head restraint 1 does not comprise a push button release.

FIGS. 49C and 49D show a head restraint 1 according to the present invention. The head restraint 1 is supported by support posts 10 which are fixed to a backrest 2 of a seat. The head restraint 1 is movable from a locking-position to a releasing-position by a translational movement in the releasing direction 407. To comfortable move the head restraint 1 from the locking-position to the releasing-position, the head restraint 1 comprises a strap 408. When the head restraint acquires the usage-position and the releasing-position, as shown with dashed lines in FIG. 49C, the head restraint is able to pivot to the storage-position, as shown in FIG. 490. The term usage-position is used to indicate, that the head restraint is e.g. in an upright position. The terms usage-position and storage-position describe only rotational orientations of the head restraint. In contrast to that the terms locking-position and releasing-position describe only a translational displacement of the head restraint. Thus the exact position of the head restraint is described by indicating both whether the head restraint acquires the usage-position or the storage-position and whether the head restraint acquires the locking-position or the releasing-position. However it is possible that the head restraint cannot acquire certain combinations. According to the present invention it is preferred that the head restraint cannot acquire the locking-position and the storage-position at the same time.

Figures 50A, 50B:
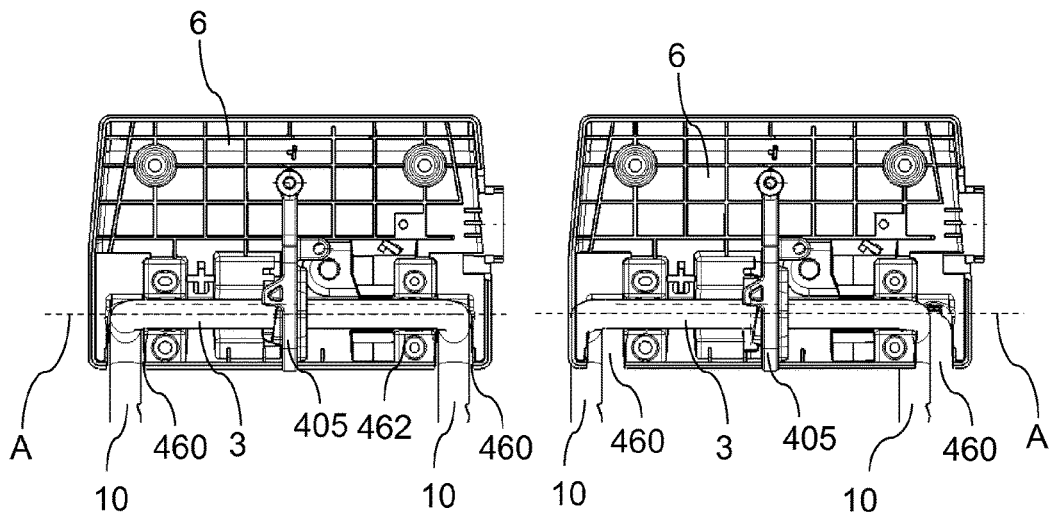
FIGS. 50A and 50B show a vehicle seat according to the present invention in a front view, wherein a part of the cover is removed for illustrative purposes.

FIG. 50A shows the head restraint acquiring the usage-position and the locking-position. The head restraint comprises a cover 6 which comprise slots 460, wherein the support posts 10 extend through the slots 460. There is a cross portion 3 extending between support posts 10, wherein the cross portion 3 is fixed to the support posts 10 or the support posts 10 and the cross portion 3 are formed of a single tube element. The cover 6 furthermore comprises pivot axis bearing surfaces 462 bearing the cross portion 3, thereby defining the axis A, which the head restraint 1 is pivoted about. The head restraint 1 comprises a second locking element 405 that is fixed to the cover 6. The pivot axis bearing surfaces 462 are configured to not only pivot the head restraint about the axis A, but to also bear the head restraint 1 in a way that the head restraint can slide parallel to the axis A.

FIG. 50B shows the head restraint 1 acquiring the usage-position and the releasing-position. The head restraint 1 is translationally displaced by sliding parallel to the axis A compared to FIG. 50A. This is possible since the slots 460 have an extension that allows the displacement of the head restraint 1 parallel to axis A from the locking-position to the releasing-position. Since the second locking element 405 is fixed to the cover 6, the second locking element 405 is displaced relative to the cross portion 3 together with the other components of the head restraint 1. Thereby the second locking element 405 disengages from a first locking element 404, that is fixed to the cross portion 3 and shown in FIG. 51. In the embodiment shown in FIGS. 50A, 50B and 51, the first locking element 404 is a locking pin and the second locking element 405 is a locking plate comprising a recess 451. The recess 451 accommodates the first locking element 404, when the head restraint 1 acquires the locking-position. Thus, when the head restraint 1 acquires the locking-position, the head restraint 1 cannot be pivoted about the axis A. When the second locking element 405 disengages from the first locking element 404, the head restraint 1 can be pivoted about the axis A from the usage-position to the storage-position.

Figure 51:
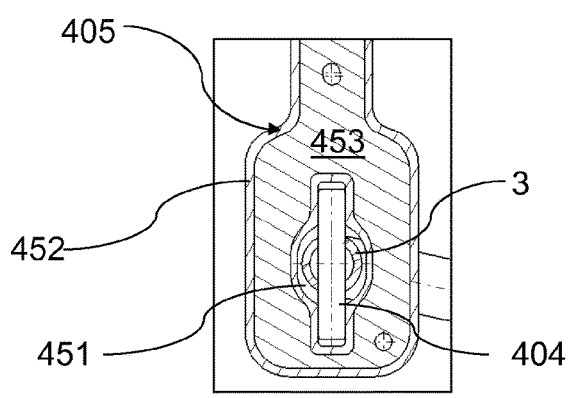
FIG. 51 shows a detail of a cross section of a plane of the vehicle seat according to the present invention, wherein the plane extends perpendicular to the axis.

In FIG. 51 it can be seen that the second locking element 405, which in this embodiment is a locking plate, is an overmolded part comprising a plate 453, preferably a steel plate 453 and an overmolding material 452. The overmolding material can be a polymer. As can be seen in FIG. 51 the first locking element 404 bears against the overmolding material.

LIST OF REFERENCE SIGNS 1 head restraint
2 backrest
3 cross portion
4 locking disc
5 cam
6 cover
7 housing brackets
8 pull point
9 contact stops
10 support post
11 lock spring
12 cap
13 steel plate
41 second bearing surface
42 third bearing surface
43 hook shaped protrusion
44 fourth bearing surface
51 first bearing surface
53 arm
54 first arced surface
61 pivot contact feature
63 guides
71 pivot bearing surface
72, 73 parts
74 connecting pin
75 locking pin
80 wedge release
82 release link
85 button post
86 blocking-surface
87 second arced surface
100 spring
101 leg
102 leg
103 opening
104 first wedge
105 second wedge
106 wedge spring
204 locking pin
205 latch
207 push point
251 bearing surface
252 notch
253 further bearing surface
270 push button
271 push button link
303 cross tube
305 lock plate
307 sliding direction
309 rubber bumpers
311 spring
331 flattened segment
332 second segment
333 third segment
334 second bearing surface
335 fourth bearing surfaces
352 recess
354 first bearing surface
355 third bearing surfaces
356 fifth bearing surface
361 pivot axis bearing surfaces
362 support walls
308 push button
381 push button link
382 release link
404 first locking element
405 second locking element
407 releasing direction
408 strap
409 push button release
451 recess
452 overmolding material
453 steel plate
460 slots
462 pivot axis bearing surfaces
500 sleeve
600 cable
601 cable conduit
602 push button
603 button post
A first pivot axis
B second pivot axis
C release link pivot axis

The invention claimed is:

1. A mechanism for folding a head restraint for a backrest of a seat, the mechanism comprising a head restraint and a cross portion,
wherein the cross portion is fixed relative to the backrest,
wherein the cross portion defines a first pivot axis, which the head restraint is pivoted about,
wherein the cross portion comprises a locking disc,
wherein the head restraint comprises a cam,
wherein the cam is pivoted about a second pivot axis,
wherein the head restraint is configured to be positioned in a usage-position relative to the cross portion and a storage-position relative to the cross portion,
wherein a position of the head restraint is changeable between the usage-position and the storage-position by pivoting about the first pivot axis,
wherein the cam is configured to be positioned in a locking-position relative to the head restraint and a releasing-position relative to the head restraint,
wherein, when the cam acquires the locking-position and the head restraint acquires the usage-position, a first bearing surface, being a bearing surface of the cam, bears against and/or faces a second bearing surface, being a bearing surface of the locking disc,
wherein the head restraint is locked in the usage-position when the head restraint acquires the usage-position and the cam acquires the locking-position, wherein the head restraint is unlocked with respect to pivoting about the first pivot axis when the cam is in the releasing-position, wherein at least the cam and the locking disc are at least partly accommodated in at least one housing bracket, wherein the at least one housing bracket accommodates a locking pin, where one end of the locking pin is rigidly connected thereto, and the locking pin at least partially protrudes from the at least one housing bracket, wherein an opposing end of the locking pin is rigidly connected to another housing bracket, wherein at least the cam and the locking disc are at least partly accommodated in two or more of the housing brackets, and wherein, when the head restraint acquires the storage-position, the locking pin bears against the second bearing surface.

2. The mechanism according to claim 1, wherein in a normal-use situation, the first bearing surface has clearance to the second bearing surface.

3. The mechanism according to claim 1, wherein the locking disc comprises a third bearing surface, and wherein, when the cam acquires the locking-position and the head restraint acquires the storage-position, the first bearing surface bears against the third bearing surface preventing the head restraint from pivoting beyond the storage position.

4. The mechanism according to claim 3, wherein the third bearing surface comprises a hook-shaped protrusion preventing the first bearing surface from sliding off the third bearing surface.

5. The mechanism according to claim 1, wherein the housing brackets accommodate a release link, and wherein the release link is configured to bear against the cam when a force is applied to the release link.

6. The mechanism according to claim 1, wherein the backrest comprises at least two support posts, and wherein the cross portion is fixed to the support posts.

7. The mechanism according to claim 6, wherein the head restraint is biased by a spring, and wherein at least one housing bracket is arranged between the spring and the locking disc.

8. The mechanism according to claim 1, wherein the head restraint comprises a wedge release, and wherein the wedge release is configured to bear against an arm of the cam when a force is applied to the wedge release.

9. The mechanism according to claim 8, wherein a button post of a push button is connected to the wedge release.

10. The mechanism according to claim 8, wherein the wedge release is able to acquire a further locking-position and a further releasing-position, wherein the wedge release is movable from the further locking-position to the further releasing-position by a translational movement, and wherein the wedge release is configured to move the cam from the locking-position to the releasing-position by moving from the further locking-position to the further releasing-position.

11. The mechanism according to claim 10, wherein the wedge release comprises a blocking-surface configured to prevent the cam from moving from the locking-position to the releasing-position when the wedge release acquires the further locking-position.

12. The mechanism according to claim 10, wherein the head restraint comprises a front and/or rear cover, wherein the front and/or rear cover comprises guides, and wherein the guides of the front and/or rear cover are configured to retain the wedge release and allow the translational movement of the wedge release.

13. The mechanism according to claim 1, wherein the seat is a vehicle seat.

14. The mechanism according to claim 1, wherein at least the cam and the locking disc are at least partly accommodated in at least two of the housing brackets.

* * * * *